(12) United States Patent
Ohsawa et al.

(10) Patent No.: US 10,256,473 B2
(45) Date of Patent: Apr. 9, 2019

(54) POSITIVE ELECTRODE FOR LITHIUM BATTERY

(71) Applicant: NISSAN MOTOR CO., LTD., Yokohama-shi, Kanagawa (JP)

(72) Inventors: Yasuhiko Ohsawa, Kanagawa (JP); Hajime Satou, Kanagawa (JP); Hiroshi Akama, Kanagawa (JP); Hideaki Horie, Kanagawa (JP); Yusuke Mizuno, Kanagawa (JP); Hiroshi Fukumoto, Kanagawa (JP); Masatoshi Okura, Kanagawa (JP); Yasuhiro Shindo, Kanagawa (JP); Yasuhiro Tsudo, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/561,558

(22) PCT Filed: Mar. 25, 2016

(86) PCT No.: PCT/JP2016/059631
§ 371 (c)(1),
(2) Date: Sep. 26, 2017

(87) PCT Pub. No.: WO2016/158754
PCT Pub. Date: Oct. 6, 2016

(65) Prior Publication Data
US 2018/0090766 A1    Mar. 29, 2018

(30) Foreign Application Priority Data

Mar. 27, 2015 (JP) ................................ 2015-067223

(51) Int. Cl.
*H01M 4/66* (2006.01)
*H01M 4/13* (2010.01)
(Continued)

(52) U.S. Cl.
CPC ............... *H01M 4/66* (2013.01); *H01M 4/13* (2013.01); *H01M 4/625* (2013.01); *H01M 4/667* (2013.01);
(Continued)

(58) Field of Classification Search
CPC ............ H01M 4/66; H01M 4/13; H01M 4/62; H01M 4/625; H01M 10/052; H01M 10/0525
See application file for complete search history.

(56) References Cited

U.S. PATENT DOCUMENTS

2008/0220330 A1    9/2008  Hosaka et al.
2012/0189912 A1*   7/2012  Honda .................. H01M 4/667
                                                      429/211

(Continued)

FOREIGN PATENT DOCUMENTS

JP    2002-203562 A    7/2002
JP    2003-157852 A    5/2003
(Continued)

*Primary Examiner* — Karie O'Neill Apicella
(74) *Attorney, Agent, or Firm* — Foley & Lardner LLP

(57) ABSTRACT

To provide a means for improving durability of a positive electrode for a lithium battery (in particular, a resin current collector for forming the positive electrode).

The means is achieved by a positive electrode for a lithium battery having a resin current collector containing a polyolefin-based resin matrix and a conductive filler, and a positive electrode active material layer provided on the resin current collector, characterized in that an electron conductive layer is disposed on the surface of the resin current collector that is in contact with the positive electrode active material layer.

19 Claims, 4 Drawing Sheets

(51) Int. Cl.
    *H01M 4/62*    (2006.01)
    *H01M 10/052*  (2010.01)
    *H01M 6/48*    (2006.01)
    *H01M 4/02*    (2006.01)
(52) U.S. Cl.
    CPC ............ *H01M 4/668* (2013.01); *H01M 6/48* (2013.01); *H01M 10/052* (2013.01); *H01M 2004/028* (2013.01); *H01M 2004/029* (2013.01)

(56) References Cited

U.S. PATENT DOCUMENTS

| | | |
|---|---|---|
| 2014/0099537 A1 | 4/2014 | Kato et al. |
| 2014/0147746 A1 | 5/2014 | Tanaka |
| 2014/0186699 A1 | 7/2014 | Kato et al. |
| 2015/0017522 A1 | 1/2015 | Miyatake et al. |

FOREIGN PATENT DOCUMENTS

| | | |
|---|---|---|
| JP | 2006-190649 A | 7/2006 |
| JP | 2007-213930 A | 8/2007 |
| JP | 2012-216561 A | 11/2012 |
| JP | 2013-26192 A | 2/2013 |
| KR | 10-2012-0043104 A | 5/2012 |
| KR | 10-2012-00043140 A | 5/2012 |
| KR | 10-2014-0038943 A | 3/2014 |
| KR | 10-2014-0123531 A | 10/2014 |
| WO | WO 2012/161180 A1 | 11/2012 |

* cited by examiner (b) BIRD'S EYE VIEW (SAMPLE SLOPE OF 45 DEGREES)
PHOTOGRAPHY MAGNIFICATION RATIO: 20,000

POSITIVE ELECTRODE FOR LITHIUM BATTERY

TECHNICAL FIELD

The present invention relates to a positive electrode for a lithium battery.

BACKGROUND ART

Recently, the use of various electric vehicles has been promoted with the expectation of solving environmental and energy issues. A secondary battery is being developed intensively as a vehicle-mounted power source, such as a motor driving power source, which holds the key to the widespread use of these electric vehicles. However, in order to ensure the widespread use, it is necessary to increase the performance and reduce the cost of a battery. In addition, with an electric vehicle, it is necessary to bring the single-charge driving distance closer to that of a gasoline engine vehicle. Thus, a battery with higher energy density is in demand. In order for a battery to have a high energy density, it is necessary to reduce as much as possible battery members that are not directly related to a battery reaction. As a battery which allows saving of a current collecting tab of a battery or a bus bar for connection between batteries, has very high volume efficiency, and is suitable for mounting in vehicles, a bipolar type secondary battery has been suggested. In the bipolar type secondary battery, a bipolar type electrode in which a positive electrode is formed on one surface of a current collector and a negative electrode is formed on the other surface of a current collector is used. Furthermore, the bipolar type secondary battery has a structure in which plural bipolar electrodes are layered such that the positive electrode and negative electrode can face each other while being mediated by a separator (electrolyte layer) containing an electrolyte. Accordingly, the bipolar type secondary battery forms one battery cell (i.e., single battery layer) consisting of a current collector, a positive electrode, a negative electrode and a separator (i.e., electrolyte layer) present between current collectors. Furthermore, for the purpose of having even higher performance, a so-called resin current collector using a resin matrix in which a conductive filler is dispersed as a current collector has been suggested (see, Patent Literature 1, for example).

CITATION LIST

Patent Literatures

Patent Literature 1: JP 2006-190649 A

SUMMARY OF INVENTION

Technical Problem

However, the positive electrode described in Patent Literature 1 in which a resin current collector is used has a problem that, when durability conditions are changed to have a temperature slightly higher than room temperature, rapid cycle deterioration is caused compared to a positive electrode in which a typical Al collector is used.

Accordingly, an object of the present invention is to provide a means for improving cycle deterioration of a positive electrode in which a resin current collector is used.

Solution to Problem

The inventors of the present invention conducted intensive studies to suppress the cycle deterioration of an electrode in which a resin current collector is used. As a result, based on the finding that an improvement can be obtained by disposing an electron conductive layer for having no direct contact of a conductive filler on a surface of a resin current collector with an electrolyte solution or having high ion conduction resistance even with the contact between them, and also for hardly allowing an occurrence of an oxidative side reaction on a conductive filler that is in contact with a resin matrix and for having an electronic connection to a resin current collector, the present invention is completed accordingly.

Namely, an object of the present invention can be achieved by a positive electrode for a lithium battery having a constitution in which an electron conductive layer is disposed on a surface of a resin current collector that is in contact with a positive electrode active material layer.

DESCRIPTION OF EMBODIMENTS

Figure 1:
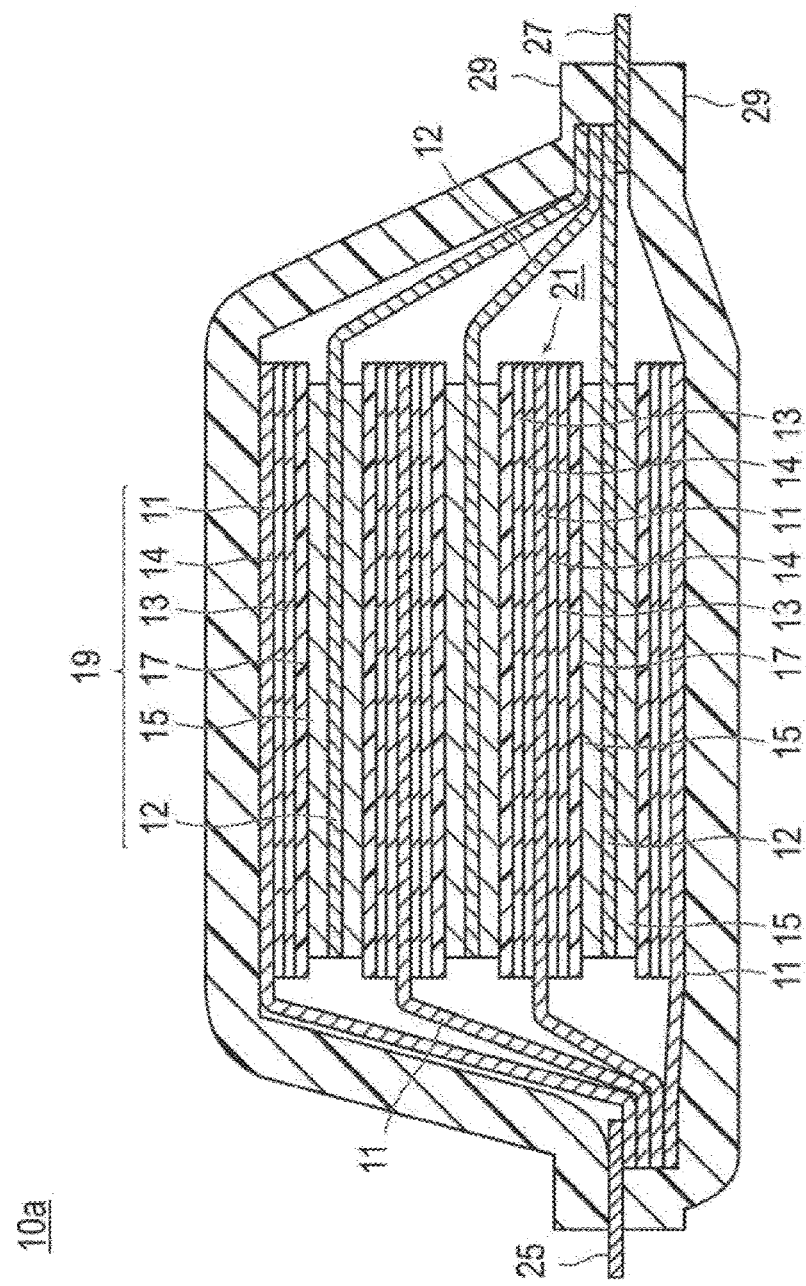
FIG. 1 is a cross-sectional view schematically illustrating a basic constitution of a flat type (laminate type) and non-bipolar type non-aqueous electrolyte lithium ion secondary battery as one embodiment of a lithium ion secondary battery of the present invention.

Embodiments of the present invention include a positive electrode for a Li battery which has a resin current collector containing a polyolefin-based resin matrix and a conductive filler, and a positive electrode active material layer provided on the resin current collector, characterized in that an electron conductive layer is disposed on the surface of the resin current collector that is in contact with the positive electrode active material layer. Herein, the positive electrode active material layer provided on the resin current collector may be a positive electrode active material layer that is provided not directly on the resin current collector but via the electron conductive layer formed on the resin current collector.

As the positive electrode for a lithium battery of this embodiment has the above constitution, i.e., the constitution in which an electron conductive layer is provided on the surface of a resin current collector that is in contact with a positive electrode active material layer, the durability of the positive electrode can be enhanced and also the cycle life of a battery using the positive electrode can be greatly improved.

Namely, the inventors of the present invention conducted intensive studies to suppress the cycle deterioration of an electrode in which a resin current collector is used. As a result, it was found that, in a positive electrode in which the above resin current collector is used, rapid cycle deterioration is caused compared to a typical Al current collector when the durability conditions are set to have a temperature slightly higher than room temperature. According to a cross-sectional SEM image of a resin current collector of a positive electrode with deteriorate cycle, protrusions were observed inside the image. Although specific mechanisms for the deterioration reaction remain unclear, it is believed that the problematic reaction occurs in a region in which a conductive filler (e.g., acetylene black), a resin, and, an electrolyte solution are present on the resin current collector. For having an occurrence of the problematic reaction near the interface at which the conductive filler is in contact with a resin matrix on the resin current collector, it is required to have a movement of ions in a space limited by the opposite negative electrode. Accordingly, based on the idea that an improvement can be obtained by disposing, on the surface of a resin current collector that is in contact with the positive electrode active material layer, an electron conductive layer which does not allow or hardly allows ions to pass through so as to hardly cause the same deterioration reaction as the reaction at an interface between the resin matrix and conductive filler, the present invention is achieved.

Namely, on the surface of a resin current collector that is in contact with a positive electrode active material layer, an electron conductive layer for having no direct contact of a conductive filler on a surface of a resin current collector with an electrolyte solution or having high ion conduction resistance even with the contact between them, and also for hardly allowing an occurrence of an oxidative side reaction on a conductive filler that is in contact with the resin and for having an electronic connection to a resin current collector is disposed.

By having the above constitution, the aforementioned problem is solved and the object of the present invention can be achieved.

First of all, explanations are given for a lithium ion secondary battery in which the positive electrode for a Li battery according to one embodiment is used. However, the present invention is not limited to the following embodiments. Furthermore, the same reference numerals are assigned to the same elements in the description of the drawings, and duplicate descriptions are omitted. Furthermore, the dimensional ratio of the drawings is somewhat exaggerated for the sake of the explanation, and may thus be different from the actual ratio.

The lithium ion secondary battery as a subject of this embodiment is preferably formed by using the positive electrode explained below. Other constitutional elements are not particularly limited.

For example, when the lithium ion secondary battery is classified in terms of the shape and structure, the lithium ion secondary battery may be applicable to any batteries having known shapes and structures such as a laminate type (flat) battery and a wound type (cylindrical) battery. By employing the battery structure of the laminate type (flat) (see, FIGS. 1 and 2), long-term reliability by a simple sealing technology such as thermo-compression bonding can be obtained, and therefore it has the advantage in terms of cost and workability.

Furthermore, in terms of electrical connection (electrode structure) inside the lithium ion secondary battery, the lithium ion secondary battery may be applicable not only to a non-bipolar (internal parallel connection type) battery but also to a bipolar (internal serial connection type) battery.

When the lithium ion secondary battery is classified in terms of the type of an electrolyte layer used therein, the lithium ion secondary battery may be applicable to batteries including various types of known electrolyte layers such as a solution electrolyte type battery in which a solution electrolyte such as a non-aqueous electrolysis solution is used for an electrolyte layer and a polymer battery in which a polymer electrolyte is used for an electrolyte layer. The polymer battery is further classified into a gel electrolyte type battery using a polymer gel electrolyte (also simply referred to as a gel electrolyte) and a solid polymer (all solid state) type battery using a polymer solid electrolyte (also simply referred to as a polymer electrolyte).

FIG. 1 is a cross-sectional view schematically illustrating the basic configuration of a flat type (laminate type) and non-bipolar type non-aqueous electrolyte lithium ion secondary battery (hereinbelow, also simply referred to as a "laminate type battery") according to one embodiment of the present invention. As illustrated in FIG. 1, a laminate type battery (10a) according to this embodiment has a configuration in which a substantially rectangular power generating element (21), in which a charging and discharging reaction actually progresses, is sealed inside a battery outer casing (29) as an outer body. Herein, the power generating element (21) has a configuration in which a positive electrode, an electrolyte layer (17), and a negative electrode are laminated. The positive electrode has a structure in which, on both surface of a positive electrode current collector (11), which is a resin current collector containing an olefin-based resin matrix and a conductive filler, an electronically connected (i.e., electrically bound) electron conductive layer (14) with electron conductivity and low ion conductivity and a positive electrode active material layer (13), are disposed in this order. The negative electrode has a structure in which, on both surface of a negative electrode current collector (12), which is a resin current collector containing a resin matrix and a conductive filler, a negative electrode active material layer (15) is disposed. Specifically, the negative electrode, the electrolyte layer, and the positive electrode are laminated in this order such that positive electrode current collector (11), the electron conductive layer (14) and the positive electrode active material layer (13), and the negative electrode active material layer (15) which faces adjacent to the positive electrode active material layer and the negative electrode current collector (12) with the electrolyte layer (17) interposed therebetween. Accordingly, the positive electrode, the electrolyte layer, and the negative electrode that are adjacent to one another constitute a single battery layer (19). Thus, it can be also said that the laminate type battery (10a) illustrated in FIG. 1 has a configuration in which the plural single battery layers (19) are laminated so as to be electrically connected in parallel. Furthermore, the electrolyte layer (17) has a configuration in which it is formed by storing and maintaining an electrolyte (solution electrolyte, gel electrolyte, or the like) in an in-plain center part of a separator as a substrate.

Meanwhile, although the outermost positive electrode current collector located on both outermost layers of the power generating element (21) is provided with the electron conductive layer (14) and the positive electrode active material layer (13) only on one side thereof, the outermost positive electrode current collector may be provided with the electron conductive layer (14) and the positive electrode active material layer (13) on both sides thereof. That is, it is not limited to a current collector having the electron conductive layer (14) and the positive electrode active material layer (13) provided only on one surface to be used exclusively for the outermost layer, and a current collector provided with the electron conductive layer (14) and the positive electrode active material layer (13) on both sides thereof may be also used by itself as a current collector of an outermost layer. Furthermore, it is also possible that, by reversing the arrangement of the positive electrode and the negative electrode illustrated in FIG. 1, the outermost negative electrode current collector is present on both outermost sides of the power generating element (21) and the negative electrode active material layer is arranged on a single side or both sides of the corresponding outermost negative electrode current collector.

A positive electrode current collecting plate (25) and a negative electrode current collecting plate (27) which are electrically conductive to the respective electrodes (the positive electrodes and the negative electrodes) are attached to the positive electrode current collector (11) and the negative electrode current collector (12), respectively. The positive electrode current collecting plate (25) and the negative electrode current collecting plate (27) are held by being inserted between the respective end portions of the battery outer casing (29) and exposed to the outside of the battery outer casing (29). The positive electrode current collecting plate (25) and the negative electrode current collecting plate (27) may be attached to the positive electrode current collector (11) and the negative electrode current collector (12) of the respective electrodes via a positive electrode lead and a negative electrode lead (not illustrated in the drawing) as appropriate by, for example, ultrasonic welding or resistance welding.

Furthermore, according to the battery configuration illustrated in FIG. 1, it is preferable that the electron conductive layer (14) is disposed (formed) on both surfaces of the positive electrode current collector (11). That is because, if the electron conductive layer (14) is provided on only one surface (single surface) of the positive electrode current collector (11), durability deterioration of the positive electrode current collector (11) as a resin current collector may be caused from the surface on the other side (other surface) of the positive electrode current collector (11) not provided with the electron conductive layer (14). Furthermore, although the electron conductive layer (14) is provided on both surfaces of the all positive electrode current collector (11) according to the battery configuration illustrated in FIG. 1, the present invention is not limited to the above configuration. Namely, for a case in which a laminate type battery has plural single battery layer (19) (positive electrode current collector (11)), the electron conductive layer (14) may be disposed for at least one positive electrode current collector (11). However, the electron conductive layer (14) is preferably disposed on both surfaces of the all positive electrode current collector (11).

Figure 2:
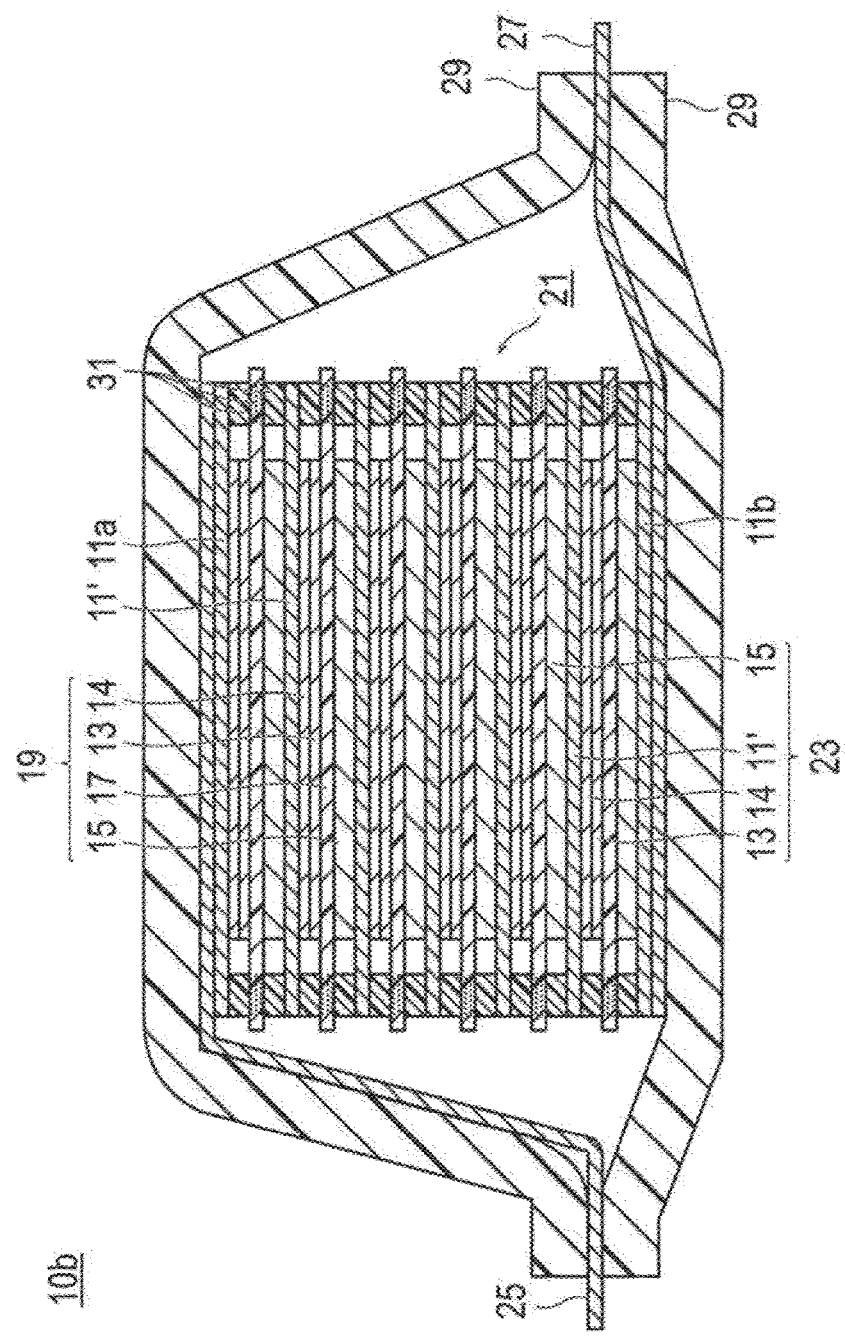
FIG. 2 is a cross-sectional view schematically illustrating a basic constitution of a flat type (laminate type) and bipolar type non-aqueous electrolyte lithium ion secondary battery as another embodiment of the lithium ion secondary battery of the present invention.

FIG. 2 is a cross-sectional view schematically illustrating the basic configuration of a flat type (laminate type) and bipolar type non-aqueous electrolyte lithium ion secondary battery (10b) (hereinbelow, also simply referred to as a "bipolar type battery") according to another embodiment of the present invention. The bipolar type battery (10b) illustrated in FIG. 2 has a configuration in which a substantially rectangular power generating element (21), in which a charging and discharging reaction actually progresses, is sealed inside a laminate film (29) as an outer casing material.

As illustrated in FIG. 2, the power generating element (21) of the bipolar type battery (10b) has plural bipolar type electrode (23). Each bipolar type electrode (23) has a structure in which, on one surface of a positive electrode current collector (11'), which is a resin current collector containing an olefin-based resin matrix and a conductive filler, an electronically connected (i.e., electrically bound) electron conductive layer (14) with electron conductivity and low ion conductivity and a positive electrode active material layer (13), are disposed in this order. Furthermore, each bipolar type electrode (23) has a configuration in which the negative electrode active material layer (15) is disposed on a surface opposite to the bipolar type current collector (11'). With the electrolyte layer (17) interposed therebetween, each bipolar type electrode (23) is laminated to form the power generating element (21). Furthermore, the electrolyte layer (17) has a configuration in which it is formed by storing and maintaining an electrolyte (solution electrolyte, gel electrolyte, or the like) in an in-plain center part of a separator as a substrate. At that time, each of the bipolar type electrode (23) and the electrolyte layer (17) is alternately laminated such that (the electron conductive layer (14) and) the positive electrode active material layer (13) of one bipolar type electrode (23) and the negative electrode active material layer (15) of the bipolar type electrode (23), which is adjacent to the above one bipolar type electrode, can face each other with the electrolyte layer (17) interposed therebetween. Namely, the electrolyte layer (17) is inserted between the positive electrode active material layer (13) of one bipolar type electrode (23) and the negative electrode active material layer (15) of the other bipolar type electrode (23) which is adjacent to the above one bipolar type electrode (23). Furthermore, the positive electrode of the battery configuration illustrated in FIG. 2 has at least the bipolar type current collector (11'), the electron conductive layer (14), and the positive electrode active material layer (13) as a constitutional member. Furthermore, the negative electrode has at least the bipolar type current collector (11') and the negative electrode active material layer (15) as a constitutional member.

The bipolar type current collector (11'), the electron conductive layer (14), the positive electrode active material layer (13), the electrolyte layer (17), the negative electrode active material layer (15), and the bipolar type current collector (11') that are adjacent to one another form one single battery layer (19). Furthermore, because one bipolar type current collector (11') has a bipolar current collecting function, i.e., for positive electrode and negative electrode, as the name of the bipolar type current collector (11') indicates, the bipolar type current collector (11') for forming the positive electrode of one single battery layer (19) can be also the bipolar type current collector (11') for forming the negative electrode of other single battery layer (19). As such, it can be also said that the bipolar type battery (10b) has a constitution that it is formed by lamination of the single battery layer (19). Furthermore, for the purpose of preventing liquid junction caused by leakage of an electrolyte solution (solution electrolyte) from the electrolyte layer (17), a seal part (i.e., insulating layer) (31) is disposed on an outer periphery of the single battery layer (19). Furthermore, only on a single surface of the outermost layer bipolar type current collector on the positive electrode side (11*a*) that is present on the outermost layer of the power generating element (21), the electron conductive layer (14) and the positive electrode active material layer (13) are formed. Furthermore, only on a single surface of the outermost layer bipolar type current collector (11*b*) on the negative electrode side that is present on the outermost layer of the power generating element (21), the negative electrode active material layer (15) is formed. In this regard, it is also possible that, on both surfaces of the outermost layer bipolar type current collector on the positive electrode side (11*a*), the electron conductive layer (14) and the positive electrode active material layer (13) as the positive electrode constitutional member and the negative electrode active material layer (15) as the negative electrode constitutional member are formed. Similarly, it is also possible that, on both surfaces of the outermost layer bipolar type current collector on the negative electrode side (11*b*), the negative electrode active material layer (15) as the negative electrode constitutional member and the electron conductive layer (14) and the positive electrode active material layer (13) as the positive electrode constitutional member are formed.

Furthermore, in the bipolar type secondary battery (10*b*) illustrated in FIG. 2, a positive electrode current collecting plate (25) is disposed such that it can be adjacent to the outermost layer current collector on the positive electrode side (11*a*), and it is extended and drawn from the laminate film (29) as a battery outer casing material. Incidentally, a negative electrode current collecting plate (27) is disposed such that it can be adjacent to the outermost layer bipolar type current collector on the negative electrode side (11*b*), and it is also extended and drawn from the laminate film (29) as a battery exterior.

In the bipolar type battery (10*b*) illustrated in FIG. 2, a seal part (31) (i.e., insulating layer) is generally provided around each single battery layer (19). The seal part (31) is provided for the purpose of preventing a contact between neighboring bipolar type current collector (11') in a battery or an occurrence of short circuit resulting from subtle displacement of an end part of the single battery layer (19) in the power generating element (21). By having the seal part (31), long term reliability and safety are guaranteed so that the bipolar type battery (10*b*) with high quality can be provided.

Furthermore, number of times of laminating the single battery layer (19) is adjusted depending on desired voltage. Furthermore, in the bipolar type secondary battery (10*b*), if sufficient output can be obtained even when the electrode thickness is reduced as much as possible, it is also preferable to reduce the number of times of laminating the single battery layer (19). Even for the bipolar type secondary battery (10*b*), it is necessary to prevent environmental deterioration and impact from outside at the time of use. Thus, it is preferable to have a structure in which the power generating element (21) is sealed under reduced pressure in the laminate film (29) as a battery outer casing material, and the positive electrode current collecting plate (25) and the negative electrode current collecting plate (27) are drawn to the outside of the laminate film (29).

Furthermore, with regard to the battery configuration of FIG. 2, it is preferable that the electron conductive layer (14) is disposed (formed) on a surface which constitutes the positive electrode of the bipolar type current collector (11'). Namely, on one surface of the bipolar type current collector (11'), the electron conductive layer (14) and the positive electrode active material layer (13) are disposed (formed), and on the other surface thereof, the negative electrode active material layer (15) is disposed (formed) in the order. Furthermore, although the electron conductive layer (14) is formed for every bipolar type current collector (11') in FIG. 2, the present invention is not limited to this embodiment. Namely, when a bipolar type battery has plural single battery layers (19) (the bipolar type current collector (11')), it would be sufficient that the electron conductive layer (14) is disposed for at least one bipolar type current collector (11'). However, it is preferable to have a configuration in which the electron conductive layer (14) is disposed for every bipolar type current collector (11').

Figure 3:
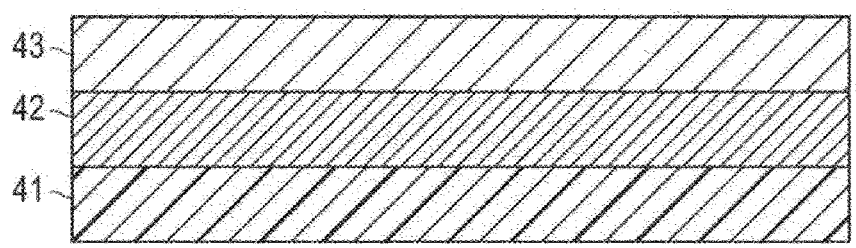
FIG. 3 is a cross-sectional view schematically illustrating one embodiment of a positive electrode for a Li battery of the present invention.

FIG. 3 is a cross-sectional view schematically illustrating one embodiment of the positive electrode for a Li battery of the present invention. The positive electrode (40) for a Li battery illustrated in FIG. 3 has a positive electrode current collector (including a bipolar type current collector) (41), which is a resin current collector containing an olefin-based resin matrix and a conductive filler, an electron conductive layer (42) which is formed on a surface of the positive electrode current collector (41), and a positive electrode active material layer (43) which is formed on a surface of the electron conductive layer (42). Furthermore, in the present specification, a positive electrode current collector, a negative electrode current collector, and a bipolar type current collector are all referred to as a "current collector". A positive electrode, a negative electrode, and a bipolar type electrode are all referred to as an "electrode". Furthermore, a positive electrode active material layer and a negative electrode active material layer are all referred to as an "active material layer". For such reasons, a "current collector" means any one of a positive electrode current collector, a negative electrode current collector, a bipolar type current collector, and a positive electrode and negative electrode current collector (there may be also a case in which a bipolar current collector is additionally included).

Figure 4:
FIG. 4 is scanning electron microscope (SEM) photograph to observe, in 45° upper direction, the surface of a resin current collector which consists of polypropylene containing 20% by mass of acetylene black.
Figure 5:
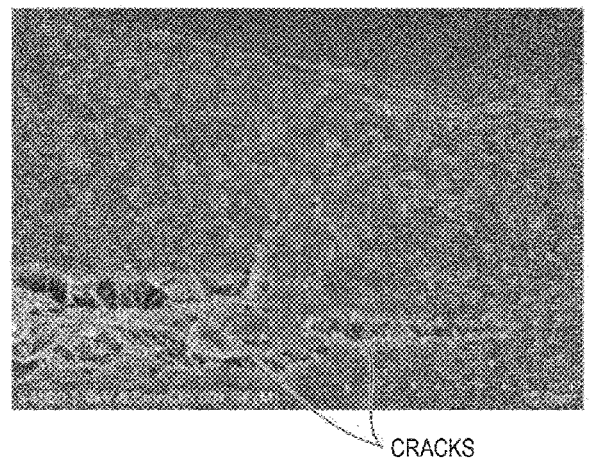
FIG. 5 is a photograph showing a cross-sectional view of a resin current collector observed by SEM that is obtained after 100 cycles following a cycle durability test of a battery, in which a conventional positive electrode having a positive electrode active material layer on top of a resin current collector of FIG. 4 is used, at charging and discharging conditions with the temperature and upper limit voltage that are increased by one kind of an acceleration test. The charging and discharging conditions include 0.2 C CC-CV charging to 4.3 V for 10 hours at 45° C. and 0.2 C CC discharging to 3.0 V, which correspond to 1 cycle, and this charging and discharging cycle was repeatedly performed.
Figure 6:
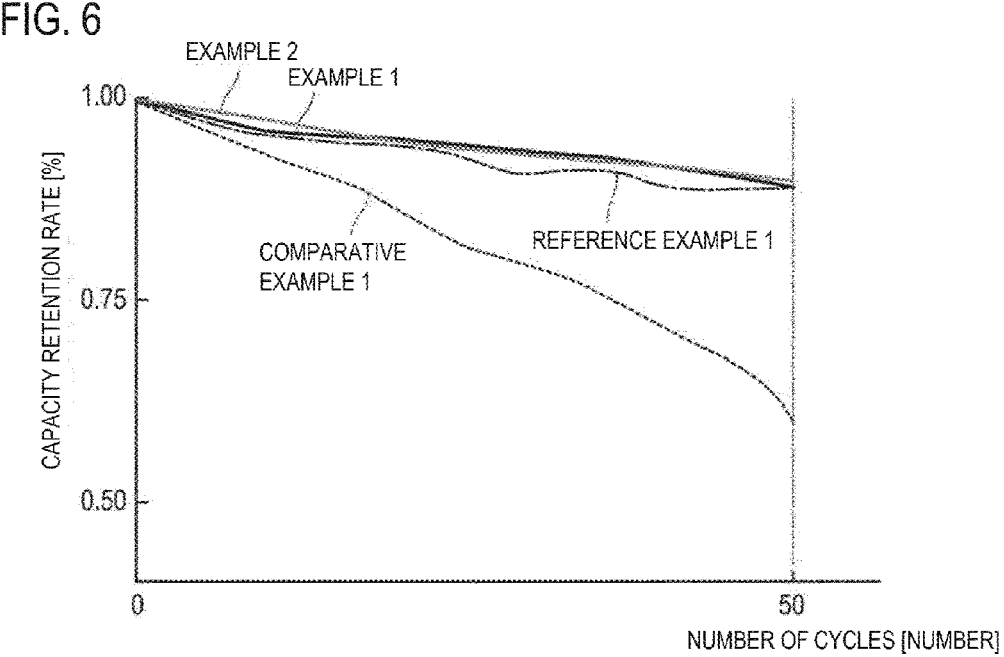
FIG. 6 is a graph showing a change in capacity retention rate relative to the initial discharge capacity against the charging and discharging cycle when a charging and discharging test is carried out for the coin cell (i.e., half cell) produced in examples and comparative examples.

In Patent Literature 1, use of a resin current collector containing an olefin-based resin matrix and carbon-based conductive filler is suggested for the purpose of enhancing the output density per weight of a secondary battery. However, with regard to the positive electrode for a Li battery in which the above resin current collector is used, it was found that cycle deterioration is easily caused at conditions which can actually occur under conditions for real use of a secondary battery in which the positive electrode is used (e.g., conditions for performing charging and discharging while the upper limit potential at 45° C. is set at 4.3 V in terms of the Li counter electrode). More specifically, compared to a positive electrode (including a positive electrode of bipolar type electrode) in which Al used for a common lithium ion secondary battery is used as a positive electrode current collector, more rapid cycle deterioration (i.e., rapid decrease in capacity of positive electrode) is shown. It was found that, because the durability of the positive electrode for a Li battery, in particular, charging and discharging cycle durability of the resin current collector used for the above positive electrode, is insufficient as a result so that a problem is caused in terms of the durability. Thus, as a result of intensive determination of the problem by the inventors of the present invention, it is found that, although the mechanism of the cycle deterioration still remains unclear, the problem is not caused by oxidation of a conductive filler as the conductive filler itself is also used for a positive electrode in which a common Al foil is used as a current collector. It is believed that the deterioration reaction is caused by, based on a certain reason, direct or indirect corrosion of the olefin-based resin matrix (i.e., material with particularly excellent durability against electrolyte solution and excellent solvent resistance among various resin matrixes) part which is in contact with the conductive filler. Thus, the inventors of the present invention focused on the near interface region between the resin current collector and positive electrode active material layer. FIG. 4 is a scanning electron microscope (SEM) photograph to observe, in 450 upper direction, the surface of a resin current collector which consists of olefin-based polypropylene (PP; resin matrix) which contains 20% by mass of acetylene black (AB) as a conductive filler. In FIG. 4, white portions indicate AB and black portions indicate PP. As it can be learned from FIG. 4, irregularities of about 1 μm are present on a surface of the resin current collector. AB is exposed in various areas of the irregularities and PP (resin matrix) is present over the entire surface (whole) while it is contact (back contact or inclusion contact) with AB in several portions. FIG. 5 is a photograph (drawing) showing the cross-sectional view of a resin current collector observed by SEM that is obtained after 100 cycles following a cycle durability test of a battery, in which a conventional positive electrode having a positive electrode active material layer on top of a resin current collector of FIG. 4 is used, at charging and discharging conditions with the temperature and upper limit voltage that are increased by one kind of an acceleration test. The charging and discharging conditions include 0.2 C CC-CV (constant current and constant voltage) charging to 4.3 V for 10 hours at 45° C. and 0.2 C CC (constant current) discharging to 3.0 V, which correspond to 1 cycle, and this charging and discharging cycle was repeatedly performed. As shown in FIG. 5, it was able to confirm that protrusions (cracks) are formed in the inside (i.e., relatively the surface part) of the resin current collector. Based on those observation results, the inventors of the present invention presume that the deterioration reaction actively occurs in a region in which AB (conductive filler) and PP (olefin-based resin matrix) on a surface of a resin current collector and an electrolyte solution are co-present.

Accordingly, the inventors of the present invention conducted intensive studies to solve the problem. As a result, it was considered that the problem of cycle deterioration can be improved by providing an electron conductive layer which can suppress the above reaction and also smoothly maintain an electronic contact between a resin current collector and a positive electrode active material layer. Namely, an electron conductive layer is disposed between the current collector and the active material layer for having no direct contact of a conductive filler on a surface of a resin current collector with an electrolyte solution or having high ion conduction resistance even with the contact between them and also for hardly allowing an occurrence of an oxidative side reaction on a conductive filler that is in contact with an olefin-based resin, and for having an electronic connection to the resin current collector. In this regard, it was found that the cycle durability of a positive electrode, in particular, a resin current collector, can be greatly improved by having the above configuration (positive electrode configuration). The electron conductive layer with electron conductivity (and low ion conductivity) is disposed on a surface of a resin current collector that is in contact with a positive electrode active material layer, the deterioration reaction can be suppressed and also the electronic contact between the resin current collector and the positive electrode active material layer can be smoothly maintained, and thus the problem of cycle deterioration can be resolved. Accordingly, the durability of a positive electrode for a Li battery, in particular, cycle durability of a resin current collector containing polyolefin-based resin matrix and conductive filler to constitute the positive electrode, can be enhanced. Furthermore, the above deterioration mechanism (working mechanism) or the like is a pure assumption, and the present invention is not limited to the above.

Hereinbelow, a lithium ion secondary battery using the above positive electrode for a Li battery is explained in greater detail. Furthermore, the "positive electrode for a Li battery" of this embodiment indicates the constitution of a positive electrode of a bipolar type electrode (i.e., constitution including a resin current collector, an electron conductive layer disposed on a single surface of the resin current collector, and a positive electrode active material layer disposed on top of the electron conductive layer) in a case in which the lithium battery is a bipolar type battery (see, FIG. 2). Furthermore, in a case in which the lithium battery is not a bipolar type battery, it indicates the constitution of a positive electrode (i.e., constitution including a resin current collector for positive electrode, an electron conductive layer disposed on both surfaces (or single surface) of the resin current collector, and a positive electrode active material layer disposed on top of the electron conductive layer) (see, FIG. 1).

[Resin Current Collector]

The positive electrode and negative electrode (an also bipolar type electrode) for a Li battery have a resin current collector which contains a polyolefin-based resin matrix and a conductive filler.

(Polyolefin-Based Resin Matrix)

Examples of the polyolefin-based resin matrix include various polyolefins such as polyethylene (PE) (high density polyethylene (HDPE), low density polyethylene (LDPE), or the like), polypropylene (PP), polymethylpentene (PMP), or polycycloolefin (PCO), and a copolymer and a mixture thereof. These materials have a very broad potential window, are stable against any of the positive electrode potential and negative electrode potential, and also have light weight, and thus high output densification of a battery can be achieved. Furthermore, among the various resin matrixes that are used for the resin current collector, they have excellent durability against an electrolyte solution to be used, in particular. From the viewpoint of the electric stability, polyethylene (PE), polypropylene (PP), polymethylpentene (PMP), and polycycloolefin (PCO) are preferable, and polyethylene (PE), polypropylene (PP), and polymethylpentene (PMP) are more preferable.

(Conductive Filler Contained in Resin Current Collector)

The conductive filler contained in the resin current collector (in view of the necessity of distinguishing it from the conductive filler contained in the electron conductive layer, it is also referred to as the conductive filler A) is selected from conductive materials. Preferred is use of a material having no conductivity in regard to lithium ions from the viewpoint of suppressing ion permeation in the resin current collector. Furthermore, the conductive filler A is preferably selected from materials which can endure the positive electrode potential and negative electrode potential to be applied. Furthermore, those having excellent corrosion resistance (oxidation resistance) are preferred from the viewpoint of further enhancing the durability of an electrode.

Specific examples of the conductive filler A include, but should not be limited to, carbon materials (carbon-based filler), aluminum, gold, silver, copper, iron, platinum, chrome, tin, indium, antimony, titanium and nickel. The conductive filler A may be used either singly or in combination of two or more types thereof. Furthermore, an alloy material or a metal oxide thereof like stainless steel (SUS) may be used. From the viewpoint of the corrosion resistance (oxidation resistance), preferred is aluminum, stainless steel, carbon materials, and nickel. More preferred is carbon materials and nickel. Furthermore, from the viewpoint of the electric stability, preferred is aluminum, stainless steel, carbon materials, silver, gold, copper, titanium and a mixture thereof. More preferred is silver, gold, aluminum, stainless steel, and carbon materials. From the viewpoint of not having high contact resistance between fillers, carbon materials (carbon-based filler) are particularly preferred. Furthermore, it is also possible that the conductive filler A is a particulate ceramic material or a resin material coated with the metal described above by plating or the like.

Examples of the carbon materials (carbon-based filler) include at least one kind selected from a group consisting of acetylene black (AB), carbon black, Vulcan, Black Pearls, carbon nanofiber, Ketjen black, furnace black, channel black, thermal lamp black, carbon nanotube, carbon nanohorn, and carbon nanoballoon, hard carbon, graphite, and fullerene. These carbon materials have a very broad potential window, are stable against any of the positive electrode potential and negative electrode potential, and also have excellent conductivity. Furthermore, because the carbon materials have very light weight, a mass increase is kept at the minimum level. Furthermore, because the carbon materials are frequently used as a conductive aid, the contact resistance becomes very low even when they are in contact with a conductive aid as they are the same materials. Furthermore, when the carbon materials are used as the conductive filler A, it is also possible that the electrolyte (solution electrolyte) affinity is lowered so as to create a state in which the electrolyte (solution electrolyte) cannot easily permeate into the voids of the resin current collector by performing a hydrophobic treatment on a surface of the carbon materials. Furthermore, excellent corrosion resistance (oxidation resistance) can be obtained and the durability of an electrode can be further enhanced.

Shape of the conductive filler A is not particularly limited, and a known shape such as particle shape, powder shape, fiber shape, plate shape, bulk shape, cloth shape, or mesh shape can be suitably selected. For example, when it is desired to have the conductivity over a broad range, it is preferable to use a conductive filler with particle shape. Incidentally, if it is desired to further enhance the conductivity in particular direction, it is preferable to use a conductive filler which has a constant orientation property in a shape like fiber shape.

An average particle diameter (i.e., average particle diameter of primary particles) of the conductive filler A is not particularly limited; however, in view of the electric properties of a battery, it is preferably in the range from 0.01 to 10 µm, and more preferably 0.01 to 1 µm or so. Furthermore, in the present specification, "the particle diameter" represents the maximum length L between any two points on the circumference of the particle (the conductive filler A). In addition, "the average particle diameter" represents a value calculated as an average value of particle diameters of the particles observed in several to several tens of fields of view with the scanning electron microscope (SEM) or the transmission electron microscope (TEM). The above definition of particle diameter and method for measuring average particle diameter may be also applied to particles other than the conductive filler A (for example, conductive filler B, positive electrode active material, and negative electrode active material).

In a case in which the conductive filler A has a fiber shape, average fiber length thereof is preferably 0.1 to 100 µm, although it is not particularly limited. Furthermore, in the present specification, the average fiber length represents a value calculated as an average value of fiber length of the fibers observed in several to several tens of fields of view with the scanning electron microscope (SEM) or the transmission electron microscope (TEM). Furthermore, in a case in which the conductive filler A has a fiber shape, average diameter thereof is not particularly limited, either. However, it is preferably 0.01 to 1 µm. With such size, the conductive filler A can have effective contact with irregularities that are present on a surface of the electron conductive layer or negative electrode active material layer. Accordingly, the electric contact between the resin current collector and the electron conductive layer or negative electrode active material layer can be further enhanced. Furthermore, the conductive filler B in the electron conductive layer to be described later can have effective contact with irregularities that are present on a surface of the resin current collector or the positive electrode active material layer. Accordingly, the electric contact between the electron conductive layer and the resin current collector or the positive electrode active material layer can be further enhanced by the conductive filler B in the electron conductive layer. Furthermore, in a case in which the conductive filler has a fiber shape, a second-dimensional (transverse) electric contact can be enhanced even with a small addition amount, and therefore desirable.

Content of the polyolefin-based resin matrix in the resin current collector is not particularly limited as long as the current collecting function is effectively exhibited and the effect of enhancing output density caused by having light weight is obtained. However, when the total amount of the polyolefin-based resin matrix and the conductive filler A in the resin current collector is 100 parts by mass, the content is preferably 10 to 95 parts by mass, and more preferably 12 to 90 parts by mass. As the content of the resin matrix is within the above range, the durability, in particular, the charging and discharging cycle durability of an electrode can be further enhanced.

Content of the conductive filler A in the resin current collector is not particularly limited, either, as long as the current collecting function is effectively exhibited and the effect of enhancing output density caused by having light weight is obtained. However, when the total amount of the polyolefin-based resin matrix and the conductive filler A in the resin current collector is 100 parts by mass, the content of the conductive filler A is preferably 5 to 90 parts by mass, and more preferably 10 to 88 parts by mass. By adding this amount of the conductive filler A to the polyolefin-based resin matrix, the resin current collector can be provided with sufficient conductivity while an increase in mass of the resin current collector is suppressed.

It is also possible for the resin current collector to contain additives other than the polyolefin-based resin matrix and the conductive filler A. Examples of other additive include carbonic acid modified polypropylene such as maleic anhydride modified polypropylene. Addition amount of those other additives is not particularly limited as long as it is within the range in which the function (performance) of the resin current collector containing the above essential components is not impaired. However, relative to 100 parts by mass of total of the polyolefin-based resin matrix and the conductive filler A, it is preferably 1 to 25 parts by mass.

The thickness of the resin current collector is preferably within the range to keep shielding properties against the electrolyte solution and strength during the process. The thickness is preferably 1 to 200 µm, more preferably 3 to 150 µm, and particularly preferably 5 to 100 µm. Within this range, the output density of the battery due to a reduction in the weights of the battery can be obtained while ensuring the shielding properties against the electrolyte solution, the strength during the process, and the conductivity.

The resin current collector preferably has resistance such that, when used for a bipolar type secondary battery, the electron conductivity in the film thickness direction (lamination direction) required for the current collector for a bipolar type secondary battery can sufficiently be ensured. The volume resistivity in the thickness direction (film thickness direction) is preferably within the range of $10^2$ to $10^{-5}$ Ω·cm.

The surface resistivity in the in-plane direction can be determined by a measurement method used in Examples according to JIS K 7194 (resistivity test method performed on conductive plastics by a four probe method). For example, a sheet (sample) cut into a predetermined dimension according to a specification of JIS is measured with a commercially available resistance measuring apparatus which complies with the specification of JIS to determine the surface resistivity of the sample.

Method for producing the resin current collector is not particularly limited, and examples thereof include a method in which the polyolefin-based resin matrix, the conductive filler A, and if necessary, each component of additives, are melt-kneaded using an extruder or the like and the materials after completing the melt-kneading are subjected to rolling using a heat press machine. Alternatively, the resin current collector may be obtained by molding of the polyolefin-based resin matrix, the conductive filler A, and if necessary, each component of additives. Examples of the molding method include injection molding, compression molding, calendar molding, slush molding, rotational molding, extrusion molding, blow molding, and film molding (such as casting, tentering, and inflation), and molding can be carried out by any method according to the purpose.

Furthermore, the resin current collector may have a single layer structure or a laminate structure in which layers consisting of those materials are suitably combined. Furthermore, it is also possible that the resin current collector has, in addition to the resin layer containing the polyolefin-based resin matrix and the conductive filler A, other layer within the range in which the working effects of the present embodiment are not impaired. Examples of the other layer include a resin layer consisting of a resin with conductivity and a metal layer. The former is preferable from the viewpoint of reducing the weight of a current collector. The latter is preferable from the viewpoint of blocking a migration of lithium ions between single battery layers. However, as long as the resin layer containing the polyolefin-based resin matrix and the conductive filler A is used at least on the surface of the resin current collector that is in contact with the positive electrode active material layer, and the above other layer may be disposed in other regions.

Furthermore, according to this embodiment, as a material for resin current collector for constituting the resin current collector, a material obtained by using those containing the dispersant for resin current collector (A), polyolefin-based resin matrix (B), and the conductive filler A (C) can be used. With the dispersant for resin current collector (A) and a material for resin current collector, a resin current collector in which the conductive filler A (C) is homogeneously dispersed can be obtained, and a sufficient charging and discharging property as a battery can be exhibited. As a result, without impairing the enhanced output per weight of a battery which is caused by reducing the weight which is a characteristic of a resin current collector, the conductive filler A is homogeneously dispersed so that a sufficient charging and discharging property can be exhibited, and a resin current collector obtained by using a material for resin current collector which contains a dispersant for resin current collector can be provided.

Among the materials for the resin current collector for constituting the resin current collector, the polyolefin-based resin matrix (B) and the conductive filler A (C) are as defined above, and thus explanations are omitted therefor. Hereinbelow, explanations are given mainly for the dispersant for resin current collector (A).

(Dispersant for Resin Current Collector)

The dispersant for resin current collector (A) of this embodiment is a dispersant for resin current collector which consists of a block polymer having a resin-philic block (A1) and a conductive filler-philic block (A2). The resin-philic block (A1) is a polymer block which has an olefin having 2 to 30 carbon atoms (a1) as an essential constituent monomer. The conductive filler-philic block (A2) is a polymer block which has at least one functional group selected from the group consisting of a carboxyl group, a 1,3-dioxo-2-oxapropylene group, a hydroxyl group, an amino group, an amide group, and an imide group.

In the dispersant for resin current collector (A), the resin-philic block (A1) has a small absolute value of the difference between the solubility parameter (hereinbelow abbreviated as SP value) of the resin-philic block (A1) and the SP value of the polyolefin-based resin matrix (B) described later, |{SP value of (B)}−(SP value of (A1)|.

Specifically, in the material for a resin current collector, the absolute value of the difference between the solubility parameter of the polyolefin-based resin matrix (B) and the SP value of the resin-philic block (A1) in the dispersant for a resin current collector (A), |{SP value of (B)}−{SP value of (A1)}|, is preferably 1.0 $(cal/cm^3)^{1/2}$ or less, more preferably 0.8 $(cal/cm^3)^{1/2}$ or less, and particularly preferably 0.5 $(cal/cm^3)^{1/2}$ or less. A difference between the SP values of 1.0 $(cal/cm^3)^{1/2}$ or less attains good dispersion of the conductive filler A (C) in the resin current collector.

The SP value is calculated by a Fedors method. The SP value can be represented by the following expression:

$$SP\ value(\delta) = (\Delta H/V)^{1/2} \qquad [\text{Expression 1}]$$

Note that ΔH represents the molar heat of vaporization (cal) and V represents the molar volume ($cm^3$).

Furthermore, for ΔH and V, the total molar heat of vaporization (ΔH) and the total molar volume (V) of the atomic group described in "POLYMER ENGINEERING AND SCIENCE, 1974, Vol. 14, No. 2, ROBERT F. FEDORS. (pp. 151 to 153)" can also be used.

The SP value is an index indicating miscibility, i.e., those having close SP values are readily mixed with each other (highly miscible), and those having distant SP values are barely mixed with each other.

The resin-philic block (A1) is a polymer block which has an olefin having 2 to 30 carbon atoms (a1) as an essential constituent monomer.

Examples of the polymer block which has the olefin (a1) as an essential constituent monomer include a polymer block in which one or more kinds of an olefin (a1) are (co)polymerized, and a polymer block in which one or more kinds of an olefin (a1) are copolymerized with one or more kinds of other monomer (b1).

Examples of the olefin (a1) include alkenes having 2 to 30 carbon atoms (hereinbelow abbreviated as C), such as C2 to 3 alkenes {ethylene and propylene}, and C4 to 30 α-olefins (such as 1-butene, isobutene, 1-hexene, 1-decene, and 1-dodecene).

Examples of the different monomer (b1) include C4 to 30 unsaturated monomers copolymerizable with the olefin (a1) other than the olefin (a1) and an ethylenically unsaturated monomer (a2) described later. Specific examples of the different monomer (b1) include styrene and vinyl acetate.

Examples of the resin-philic block (A1) include the following (A11) to (A14).

(A11) Polymer block in which ethylene is an essential constituent monomer (polyethylene block)

Examples of the polymer block in which ethylene is an essential constituent monomer include high, middle, or low density polyethylene, and polymer blocks prepared by copolymerizing ethylene with the C4 to 30 α-olefin and/or the different monomer (b1).

(A12) Polymer block in which propylene is an essential constituent monomer (polypropylene block)

Examples of the polymer block in which propylene is an essential constituent monomer (polypropylene block) include polypropylene, and polymer blocks prepared by copolymerizing propylene with the C4 to 30 α-olefin and/or the different monomer (b1).

(A13) Polymer block in which ethylene and propylene are essential constituent monomers Examples of the polymer block in which ethylene and propylene are essential constituent monomers include polymer blocks prepared by copolymerizing ethylene with propylene, and polymer blocks prepared by copolymerizing ethylene and propylene with the C4 to 30 α-olefin and/or the (b1).

(A14) Polymer block in which C4 to 30 olefin is an essential constituent monomer Examples of the polymer block in which C4 to 30 olefin is an essential constituent monomer thereof include polybutene.

Among these, preferred are the polymer blocks (A11) to (A13), more preferred are polyethylene, polypropylene, polymer blocks prepared by copolymerizing ethylene with propylene, and polymer blocks prepared by copolymerizing propylene with the monomer (b1), and still more preferred are polyethylene, polypropylene, and polymer blocks prepared by copolymerizing ethylene with propylene in view of the battery characteristics.

The conductive filler-philic block (A2) includes a polymer block having, as an essential constitutional monomer, an ethylenically unsaturated monomer (a2), which has at least one functional group selected from the group consisting of a carboxyl group (—COOH), a 1,3-dioxo-2-oxapropylene group (—CO—O—CO—), a hydroxyl group (—OH), an amino group (—NHR where R is a hydrogen atom or any substituent; the same applies to an amide group and an imide group), an amide group (—NR—CO—), and an imide group (—CO—NR—CO—).

Examples of the (a2) include an ethylenically unsaturated monomer having a carboxyl group (a21), an ethylenically unsaturated monomer having a 1,3-dioxo-2-oxapropylene group (a22), an ethylenically unsaturated monomer having a hydroxyl group (a23), an ethylenically unsaturated monomer having an amino group (a24), an ethylenically unsaturated monomer having an amide group (a25), an ethylenically unsaturated monomer having an imide group (a26), and an ethylenically unsaturated monomer having two or more of the functional groups that are described above (a27).

Examples of the ethylenically unsaturated monomer having a carboxyl group (a21) include monocarboxylic acids [including C3 to 15 such as (meth)acrylic acid, crotonic acid, and cinnamic acid], dicarboxylic acids [such as aliphatic compounds (including C4 to 24 such as maleic acid, fumaric acid, itaconic acid, citraconic acid, and mesaconic acid), aromatic compounds (including C10 to 24 such as dicarboxystyrene), and alicyclic compounds (including C8 to 24 such as dicarboxycyclohexene and dicarboxycycloheptene)], tri-, tetra-, or higher valent polycarboxylic acids [such as aliphatic compounds (including C6 to 24 such as aconitic acid), and alicyclic compounds (including C7 to 24 such as tricarboxycyclopentene, tricarboxycyclohexene, and tricarboxycyclooctene)], alkyl (C1 to 18) esters of polyvalent carboxylic acids (such as maleic acid monomethyl ester, fumaric acid monoethyl ester, itaconic acid mono-t-butyl ester, mesaconic acid monodecyl ester, and dicarboxycycloheptene didodecyl ester), and salts thereof (alkali metal salts and ammonium salts).

Examples of the ethylenically unsaturated monomer having a 1,3-dioxo-2-oxapropylene group (a22) include anhydrides of the dicarboxylic acids or the polycarboxylic acids (including C4 to 24 such as maleic anhydride, itaconic anhydride, citraconic anhydride, and aconitic anhydride).

Examples of the ethylenically unsaturated monomer having a hydroxyl group (a23) include those having C4 to 20, and specific examples thereof include hydroxystyrene, hydroxymethyl (meth)acrylate, hydroxyethyl (meth)acrylate, hydroxypropyl (meth)acrylate, (meth)allyl alcohol, 1-buten-3-ol, 2-buten-1-ol, 2-buten-1,4-diol, propargyl alcohol, and 2-hydroxyethyl propenyl ether.

Examples of the ethylenically unsaturated monomer having an amino group (a24) include (meth)acrylates having C5 to 15 and having a primary or secondary amino group [such as aminoalkyl (C1 to 6) (meth)acrylate {such as aminoethyl (meth)acrylate} and alkyl (having 1 to 6 carbon atoms) aminoalkyl (C1 to 6) (meth)acrylates {such as t-butylaminoethyl (meth)acrylate}], and C3 to 10 allyl compounds having an amino group [such as (meth)allylamine and diallylamine].

Examples of the ethylenically unsaturated monomer having an amide group (a25) include C3 to 30 (meth)acrylamide compounds [such as (meth)acrylamide; N-alkyl (C1 to 6) (meth)acrylamides {such as N-methyl (meth)acrylamide, N-butyl (meth)acrylamide, diacetone acrylamide, and N,N'-methylenebis(meth)acrylamide}; and N,N-dialkyl (C1 to 6) or diaralkyl (C7 to 15) (meth)acrylamide {such as N,N-dimethylacrylamide and N,N-dibenzylacrylamide}], C4 to 20 vinyl compounds having an amide group other than the (meth)acrylamide compounds (such as methacryl formamide, N-methyl-N-vinylacetamide, cinnamic amide, cyclic amide (such as N-vinylpyrrolidone and N-allylpyrrolidone)), vinyl compounds having a quaternary ammonium group [such as quaternized products (those quaternized with a quaternizing agent such as a methyl chloride, dimethyl sulfate, benzyl chloride, and dimethyl carbonate) of dimethylaminoethyl (meth)acrylamide and vinyl compounds having a tertiary amino group {such as diethylaminoethyl (meth)acrylamide}].

Examples of the ethylenically unsaturated monomer having an imide group (a26) include those having C4 to 24, such as maleic imide, itaconic imide, citraconic imide, and dicarboxycycloheptene imide. R in the imide group (—CO—NR—CO—) is preferably a hydrogen atom or C1 to 6 alkyl groups.

Examples of the ethylenically unsaturated monomer having two or more functional groups (a27) include those having two or more functional groups selected from the group consisting of a carboxyl group, a 1,3-dioxo-2-oxapropylene group, a hydroxyl group, an amino group, an amide group, and an imide group. Specific examples thereof include ethylenically unsaturated monomers having a carboxyl group and an amide group {such as alkyl (C1 to 18) amides of polyvalent carboxylic acids (including those having C4 to 60, such as maleic monoamide, maleic monomethylamide, fumaric monoethylamide, mesaconic monodecylamide, and dicarboxycycloheptene monododecylamide)}, and ethylenically unsaturated monomers having an amino group and an amide group {C5 to 10 acrylamides having an amino group [such as N-aminoalkyl (C1 to 6) (meth)acrylamide and N-aminoethyl (meth)acrylamide]}.

These ethylenically unsaturated monomers (a2) may be used either singly or in combination of two or more types thereof.

Among these ethylenically unsaturated monomers (a2), preferred are the ethylenically unsaturated monomer having a carboxyl group (a21) and the ethylenically unsaturated monomer having a 1,3-dioxo-2-oxapropylene group (a22), more preferred is maleic anhydride in view of the electrochemical stability.

The conductive filler-philic block (A2) may be copolymerized with a different vinyl monomer (b2) besides the ethylenically unsaturated monomer (a2).

The different vinyl monomer (b2) is not particularly limited as long as it is a vinyl monomer copolymerizable with the ethylenically unsaturated monomer (a2) other than the monomers (al) and (a2). The following vinyl monomers listed below can be used.

Alicyclic vinyl monomers include those with C3 to 20. Specific examples thereof include cyclohexene, (di)cyclopentadiene, pinene, limonene, indene, vinylcyclohexene, and ethylidene bicycloheptene.

Aromatic vinyl monomers include those with C8 to 14. Specific examples thereof include styrene, α-methyl styrene, vinyl toluene, 2,4-dimethyl styrene, ethyl styrene, isopropyl styrene, butyl styrene, phenyl styrene, cyclohexyl styrene, benzyl styrene, crotylbenzene, and vinylnaphthalene.

Aliphatic vinyl monomers include those with C2 to 28. Specific examples thereof include methyl (meth)acrylate, ethyl (meth)acrylate, propyl (meth)acrylate, and butyl (meth)acrylate.

According to this embodiment, "(meth)acrylate" means acrylate and/or methacrylate.

Vinyl monomers containing a halogen element include those having C2 to 20, and specific examples thereof include vinyl chloride, vinyl bromide, vinylidene chloride, allyl chloride, chlorostyrene, bromostyrene, dichlorostyrene, chloromethyl styrene, tetrafluorostyrene, and chloroprene.

The proportion of the ethylenically unsaturated monomer (a2) forming the conductive filler-philic block (A2) is preferably 50 to 100% by mass, more preferably 60 to 100% by mass, and particularly preferably 70 to 100% by mass based on the mass of the conductive filler-philic block (A2) in view of the dispersion property of the conductive filler A (C).

The total molar concentration of the carboxyl group (—COOH), the 1,3-dioxo-2-oxapropylene group (—CO—O—CO—), the hydroxyl group (—OH), the amino group (—NHR), the amide group (—NR—CO—), and the imide group (—CO—NR—CO—) in the conductive filler-philic block (A2) is preferably 0.0001 to 0.03 mol/g, more preferably 0.001 to 0.028 mol/g, and particularly preferably 0.01 to 0.025 mol/g on the basis of the mass of the conductive filler-philic block (A2) in view of the dispersion property of the conductive filler A (C).

The total molar concentration of the functional groups in the conductive filler-philic block (A2) can be calculated from the amounts of the monomers (a2) and (b2) charged for preparation of the material for a resin current collector (A) using the following expression.

Total molar concentration=Σ{(Charged amount of each monomer(a2))/(Molecular weight of each monomer(a2))}/{Total charged amount of(a2) and(b2)}  [Expression 2]

For the calculation of the molar concentration, when the ethylenically unsaturated monomer having two or more functional groups (a27) is used, the molar concentration is calculated assuming that the "charged amount of the each monomer (a2)" is a value obtained by multiplying the amounts of each monomer (a2) charged by the number of functional groups.

The total concentration of the carboxyl group (—COOH), the 1,3-dioxo-2-oxapropylene group (—CO—O—CO—), the hydroxyl group (—OH), the amino group (—NHR), the amide group (—NR—CO—), and the imide group (—CO—NR—CO—) in the dispersant for a resin current collector (A) is preferably 1 to 30% by mass, more preferably 1.2 to 20% by mass, and particularly preferably 1.4 to 10% by mass based on the mass of the dispersant for a resin current collector (A) in view of the dispersion property of the conductive filler A (C).

The total concentration of the functional groups in the dispersant for a resin current collector (A) can be calculated from the amounts of the monomers (a1), (a2), (b1), and (b2) charged in preparation of the dispersant for a resin current collector (A) using the following expression.

Total concentration=Σ{(Total atomic weight of functional groups of each monomer(a2) within parenthesis)×(Charged amount of each monomer(a2))/(Molecular weight of each monomer (a2))}/{Total charged amount of(a1),(a2),(b1), and(b2))}×100  [Expression 3]

The total molar concentration of the carboxyl group (—COOH), the 1,3-dioxo-2-oxapropylene group (—CO—O—CO—), hydroxyl group (—OH), the amino group (—NHR), the amide group (—NR—CO—), and the imide group (—CO—NR—CO—) in the dispersant for a resin current collector (A) is preferably 0.00005 to 0.015 mol/g, and more preferably 0.0005 to 0.014 mol/g based on the mass of the dispersant for a resin current collector (A) in view of the dispersion property of the conductive filler A (C).

The total molar concentration of the functional group(s) in the dispersant for a resin current collector (A) can be calculated by measuring the dispersant for a resin current collector (A) by $^{13}$C-NMR and IR (infrared spectroscopy), and applying the results to the calibration curve determined from samples having known molar concentrations.

The total molar concentration of the functional groups in the dispersant for a resin current collector (A) can also be calculated from the amounts of the monomers (al), (a2), (b1), and (b2) charged in preparation of the dispersant for a resin current collector (A) using the following expression.

Total molar concentration=Σ{(Charged amount of each monomer(a2))/(Molecular weight of each monomer(a2))}/{Total charged amount of(a1), (a2),(b1), and(b2)}  [Expression 4]

Examples of the method of preparing the dispersant for a resin current collector (A) include a method of introducing an unsaturated group to a polymer (A'1) {such as a polymer prepared through polymerization of a monomer containing the olefin (a1) and when necessary the monomer (b1)}, which is prepared by a standard method of preparing an olefin polymer {such as a bulk method, a solution method, a slurry method, and a gas phase method}, through a thermal degradation reaction to prepare a polymer (A"1), and adding the ethylenically unsaturated monomer (a2) {containing the monomer (b2) when necessary} to the polymer (A"1).

The solution method is a method in which a catalyst and a monomer are charged into a solvent to perform polymerization in the solution.

Examples of the solvent used in the solution method include saturated hydrocarbons [such as aliphatic hydrocarbons (including those having C3 to 24, such as propane, butane, hexane, octane, decane, dodecane, hexadecane, and octadecane); alicyclic hydrocarbons (including those having C3 to 24, such as cyclopentane, methylcyclopentane, cyclohexane, and cyclooctane); aromatic hydrocarbons (including those having C6 to 12, such as benzene, toluene, and xylene); petroleum fractions (including those having C12 to 60, such as gasoline, kerosene, and light oil)]; and olefins which are liquid during polymerization (including those C31 to 100, such as low molecular weight polyolefins).

The slurry method is a method in which a catalyst and a monomer are charged into a dispersive medium, and polymerization is performed in a slurry state.

Examples of the dispersive medium include the saturated hydrocarbons and the olefins which are liquid during polymerization.

The gas phase method is a method in which a catalyst and a monomer are charged into a gas phase, and polymerization is performed in the gas phase. Specifically, the catalyst is gradually charged into a reactor, and the monomer is charged so as to efficiently contact the catalyst to perform polymerization in the gas phase. The prepared polymer descends its own weight, and is recovered from the bottom of the reactor. The molecular weight can be controlled by a known method, such as selection of temperature, pressure, the addition amount of hydrogen.

The polymerization temperature in the gas phase method is preferably 0 to 120° C., and more preferably 20 to 100° C. in view of the dispersion property of the conductive filler A (C) and the molecular weight distribution of the (A1).

The polymerization temperature in the solution method is preferably 0 to 200° C., and more preferably 10 to 180° C. in view of the dispersion property of the conductive filler A (C) and the molecular weight distribution of the (A1).

The polymerization temperature in the slurry method is preferably −50 to 100° C., and more preferably 0 to 90° C. in view of the dispersion property of the conductive filler A (C) and the molecular weight distribution of the (A1).

The pressure in the gas phase method is preferably 0.049 to 9.8 MPa, and more preferably 0.098 to 4.9 MPa in view of the dispersion property of the conductive filler A (C), the molecular weight distribution of the (A1), and economical efficiency.

The pressure in the solution method and the slurry method is preferably 0.078 to 0.98 MPa, and more preferably 0.098 to 0.49 MPa in view of the dispersion property of the conductive filler A (C), the molecular weight distribution of the (A1), and economical efficiency.

For the polymer (A'1), if two or more olefins (a1) (and further including the monomer (b1) when necessary) are copolymerized, the binding mode can be any of random polymerization, block polymerization, and graft polymerization.

The number average molecular weight of the polymer (A'1) (hereinbelow abbreviated as Mn) is preferably 10,000 to 300,000, and more preferably 15,000 to 150,000 in view of the dispersion property of the conductive filler A (C) and the molecular weight of the dispersant for a resin current collector (A).

The Mn of the polymer (A'1) can be determined through a measurement by gel permeation chromatography (GPC) on the following conditions.

Apparatus: Alliance GPC V2000 (manufactured by Waters Corporation)
Solvent: ortho-dichlorobenzene
Standard substance: polystyrene
Sample concentration: 3 mg/ml
Column stationary phase: two columns of PLgel 10 μm and MIXED-B connected in series (manufactured by Polymer Laboratories Ltd.)
Column temperature: 135° C.

The polymer (A'1) can be thermally degraded to prepare a polymer (A"1) having an unsaturated group introduced thereinto. As used herein, the term "thermal degradation" is defined as an operation to heat treat a polymer at a temperature of 180 to 450° C. (preferably 220 to 400° C.) to control the reduction ratio Mn 2/Mn 1 of the Mn of the polymer after the treatment (described as Mn 2) to the Mn of the polymer before the treatment (described as Mn 1) to be 0.9 to 0.001.

The number of double bonds at molecular terminals and/or in the molecule is 0.2 to 10, preferably 0.3 to 6, and particularly preferably 0.5 to 5 per 1,000 carbon atoms in the polymer (A"1) having an unsaturated group introduced thereinto, in view of ease of introducing the ethylenically unsaturated monomer (a2).

The number of double bonds can be measured by NMR (nucleus magnetic resonance).

Preferred methods of preparing a polymer (A"1) having an unsaturated group introduced thereinto are thermal degradation methods (such as methods described in JP S43-9368 B, JP S44-29742 B, and JP H06-70094 B) in view of the dispersion property of the conductive filler A (C).

The thermal degradation method includes a method of thermally degrading the polymer (A'1) (1) in a continuous mode or (2) in batch mode.

In the method (1), an olefin polymer fed to a continuous tank at a constant flow rate (10 to 700 kg/h) is continuously thermally degraded preferably at 300 to 450° C. for 0.5 to 10 hours in the absence of an radical initiator and preferably at 180 to 300° C. for 0.5 to 10 hours in the presence of a radical initiator. In the method (2), an olefin polymer in a closed reactor is thermally degraded in the absence or in the presence of an organic peroxide in the same manner on the same heat treatment conditions as in the method (1).

Examples of the apparatus used in the method (1) include continuous kneaders (such as static mixers, trade name "FCM" manufactured by Farrel Corporation, trade name "LCM" manufactured by Kobe Steel, Ltd., and trade name "CIM" manufactured by The Japan Steel Works, Ltd., single screw extruders, and twin screw extruders.

Examples of the radical initiator include azo compounds (such as azobisisobutyronitrile and azobisisovaleronitrile), peroxides [monofunctional initiators (having one peroxide group in the molecule) [such as benzoyl peroxide, di-t-butyl peroxide, lauroyl peroxide, and dicumyl peroxide] and polyfunctional initiators (having two or more peroxide groups in the molecule) [such as 2,2-bis(4,4-di-t-butylperoxycyclohexyl)propane, 1,1-bis(t-butylperoxy)-3,3,5-trimethylcyclohexane, di-t-butylperoxy hexahydroterephthalate, diallylperoxy dicarbonate, and t-butylperoxyallyl carbonate]].

The amount of the radical initiator to be used is preferably 0.01 to 10% by mass, and more preferably 0.1 to 1% by mass based on the mass of the polymer (A'1) in view of the dispersion property of the conductive filler A (C) and the molecular weight distribution of the dispersant A for a resin current collector.

Among these thermal degradation methods, preferred is the method (1) in view of the molecular weight, and particularly preferred is a method of continuously thermally degrading the polymer (A'1) in the absence of the radical initiator at 300 to 450° C. for 0.5 to 10 hours while the polymer (A'1) is being fed at a constant flow rate.

Examples of the method of adding an ethylenically unsaturated monomer (a2) {containing the monomer (b2) when necessary} into the polymer (A"1) having an unsaturated group introduced thereinto include a method of heat melting the polymer (A"1) having an unsaturated group introduced thereinto and the (a2) or suspending or dissolving these (A"1) and (a2) in an appropriate organic solvent, adding the radical initiator as a radical initiator (k) [or a solution of the radical initiator (k) dissolved in an appropriate organic solvent], and stirring these components with heating (a melting method, a suspension method, and a solution method); and a method of preliminarily mixing the polymer (A"1) having an unsaturated group introduced thereinto and the (a2) {when necessary the monomer (b2)}, and melt-kneading these components (melt-kneading method).

The same radical initiators listed above can be used as the radical initiator (k). Specific examples thereof include azo compounds (azobisisobutyronitrile and azobisisovaleronitrile); peroxides [monofunctional initiators (having one peroxide group in the molecule) [such as benzoyl peroxide, di-t-butyl peroxide, lauroyl peroxide, and dicumyl peroxide], and polyfunctional initiators (having two to four or more peroxide groups in the molecule) [such as 2,2-bis(4, 4-di-t-butylperoxycyclohexyl)propane, 1,1-bis(t-butylperoxy)3,3,5-trimethylcyclohexane, di-t-butylperoxy hexahydroterephthalate, diallylperoxy dicarbonate, and t-butylperoxyallyl carbonate]].

Among these radical initiators, preferred are the peroxides, more preferred are the monofunctional initiators, and particularly preferred are di-t-butyl peroxide, lauroyl peroxide, and dicumyl peroxide in view of the reactivity of the ethylenically unsaturated monomer (a2) to the polymer (A"1) having an unsaturated group introduced thereinto.

The amount of the radical initiator (k) to be used is preferably 0.001 to 10% by mass, more preferably 0.01 to 5% by mass, and particularly preferably 0.1 to 3% by mass based on the mass of the dispersant for a resin current collector (A) in view of the reaction rate of the ethylenically unsaturated monomer (a2) to the resin-philic block having an unsaturated group introduced thereinto.

Examples of the organic solvent include C3 to 18 such as hydrocarbons (such as hexane, heptane, octane, decane, dodecane, benzene, toluene, and xylene), halogenated hydrocarbons (such as di-, tri-, or tetrachloroethane and dichlorobutane), ketones (such as acetone, methyl ethyl ketone, diethyl ketone, and di-t-butyl ketone), and ethers (such as ethyl-n-propyl ether, di-i-propyl ether, di-n-butyl ether, di-t-butyl ether, and dioxane).

Examples of the apparatus used in the melt-kneading method include extruders, Banbury mixers, and kneaders.

Among these methods, preferred are the melting method and the solution method in view of the reactivity of the polymer (A"1) having an unsaturated group introduced thereinto with the ethylenically unsaturated monomer (a2).

The reaction temperature in the melting method can be any temperature at which the polymer (A"1) having an unsaturated group introduced thereinto melts. The reaction temperature is preferably 120 to 260° C., and more preferably 130 to 240° C. in view of the reactivity of the polymer (A"1) having an unsaturated group introduced thereinto with the ethylenically unsaturated monomer (a2).

The reaction temperature in the solution method can be any temperature at which the polymer (A"1) having an unsaturated group introduced thereinto dissolves. The reaction temperature is preferably 110 to 210° C., and more preferably 120 to 180° C. in view of the reactivity of the polymer (A"1) having an unsaturated group introduced thereinto with the ethylenically unsaturated monomer (a2).

The weight average molecular weight (hereinbelow abbreviated as Mw) of the dispersant for a resin current collector (A) is preferably 2,000 to 300,000, more preferably 5,000 to 200,000, particularly preferably 7,000 to 150,000, and most preferably 10,000 to 100,000 in view of the dispersion property of the conductive filler A (C) and the battery characteristics.

The Mw of the dispersant for a resin current collector (A) can be determined by GPC (gel permeation chromatography) on the following conditions.

Apparatus: Alliance GPC V2000 (manufactured by Waters Corporation)
Solvent: ortho-dichlorobenzene
Standard substance: polystyrene
Sample concentration: 3 mg/ml
Column stationary phase: two columns of PLgel 10 μm and MIXED-B connected in series (manufactured by Polymer Laboratories Ltd.)
Column temperature: 135° C.

The dispersant for a resin current collector (A) according to the present invention is a dispersant for a resin current collector which consists of a block copolymer having the resin-philic block (A1) and the conductive filler-philic block (A2). The mass ratio {(A1)/(A2)} is preferably 50/50 to 99/1, more preferably 60/40 to 98/2, and particularly preferably 70/30 to 95/5 in view of the dispersion property of the conductive filler (C).

The content of the dispersant for a resin current collector (A) in the material for a resin current collector is preferably 1 to 20% by mass, more preferably 2 to 15% by mass, and particularly preferably 3 to 10% by mass based on the mass of the material for a resin current collector in view of the dispersion property of the conductive filler A (C).

The content of the polyolefin-based resin matrix (B) in the material for a resin current collector is preferably 20 to 98% by mass, more preferably 40 to 95% by mass, and particularly preferably 60 to 92% by mass based on the mass of the material for a resin current collector in view of resin strength.

The content of the conductive filler A (C) in the material for a resin current collector is preferably 1 to 79% by mass, more preferably 2 to 30% by mass, and particularly preferably 5 to 25% by mass based on the mass of the material for a resin current collector in view of the dispersion property of the conductive filler A (C).

The material for a resin current collector according to the present invention can be prepared by known methods: for example, a known resin is mixed and kneaded with powder to prepare a master batch or to prepare a thermoplastic resin composition (a composition containing a dispersant, a filler, and a thermoplastic resin, or a composition containing a master batch and a thermoplastic resin). The material for a resin current collector according to the present invention can be typically prepared by mixing components of pellets or powder with an appropriate mixer, such as a kneader, an internal mixer, a Banbury mixer, or a roll.

The components can be added in any order without particular limitations during kneading. The dispersant for a resin current collector (A) may be preliminarily mixed with the conductive filler A (C), and the premix may be compounded with the polyolefin-based resin matrix (B); or the dispersant for a resin current collector (A), the conductive filler A (C), and the polyolefin-based resin matrix (B) may be simultaneously mixed.

The resulting material for a resin current collector may be further formed into pellets or powder with a pelletizer.

To the material for a resin current collector, other components can appropriately be added, when necessary, such as crosslinking accelerators (such as aldehyde ammonia-amine skeleton-containing compounds, thiourea skeleton-containing compounds, guanidine skeleton-containing compounds, thiazole skeleton-containing compounds, sulfene amide skeleton-containing compounds, thiuram skeleton-containing compounds, dithiocarbamate skeleton-containing compounds, xanthogenate skeleton-containing compounds, and dithiophosphate skeleton-containing compounds), crosslinking agents (such as sulfur), colorants, ultraviolet absorbing agents, general-purpose plasticizers (phthalic acid skeleton-containing compounds, trimellitic acid skeleton-containing compounds, phosphate group containing compounds, and epoxy skeleton-containing compounds). The total amount of the other components to be added is preferably 0.0001 to 5% by mass, and more preferably 0.001 to 1% by mass relative to the mass of the material for a resin current collector in view of electrical stability.

The resin current collector of this embodiment can be also obtained by molding the material for a resin current collector. Examples of the molding method include methods such as injection molding, compression molding, calendar molding, slush molding, rotational molding, extrusion molding, blow molding, and film molding (such as casting, tentering, and inflation). The material for a resin current collector can be molded by any method according to the purpose.

The thickness of the resin current collector obtained by molding the materials for a resin current collector can be desirably within the range to keep shielding properties against the electrolyte solution and strength during the process. The thickness is preferably 5 to 200 µm, more preferably 10 to 150 µm, and particularly preferably 20 to 120 µm. As it is within this range, the output density of the battery due to a reduction in the weights of the battery can be enhanced while ensuring the shielding properties against the electrolyte solution, the strength during the process, and the conductivity.

[Electron Conductive Layer]

The positive electrode for a Li battery (including the positive electrode of a bipolar type electrode) has an electron conductive layer on a surface of the resin current collector that is in contact with positive electrode active material layer. Namely, the electron conductive layer is disposed between the resin current collector and the positive electrode active material layer. According to this configuration, it becomes possible for the electron conductive layer to have no direct contact of a conductive filler on a surface of a resin current collector with an electrolyte solution or have high ion conduction resistance even with the contact between them, and also to hardly allow an occurrence of an oxidative side reaction on a conductive filler that is in contact with a resin matrix and allow an electronic connection to a resin current collector. For such reasons, the durability of the positive electrode for a Li battery, in particular, the charging and discharging cycle durability of the resin current collector for constituting the positive electrode (including the positive electrode of a bipolar type electrode) can be greatly improved.

The volume resistivity of the electron conductive layer is preferably 20 Ωcm or less, and more preferably 5 Ωcm or less. The electron conductivity of the electron conductive layer is preferably higher than the electron conductivity of resin current collector. In other words, the volume resistance of the electron conductive layer is preferably lower than the volume resistance of the resin current collector. In this regard, If the electron conductivity of the electron conductive layer is lower than the electron conductivity of the resin current collector (i.e., volume resistance of the electron conductive layer is higher than the volume resistance of the resin current collector), the resistance itself is added to the internal resistance of a battery. It is also considered that the contact resistance between the resin current collector and the positive electrode active material layer increases. As for the method for measuring the electron conductivity and volume resistivity of the electron conductive layer, (1) solely, raw material slurry of the electron conductive layer is applied on a PET film, and the measurement can be made (or calculation is made from measurement values) by a four probe method. (2) Bulk resistance of the entire laminate structure (film) provided with an electron conductive layer on a resin current collector is measured, and calculation can be made based on comparison with the bulk resistance of a resin current collector.

Furthermore, it is preferable that the electron conductive layer has extremely small ion conductivity or no ion conductivity. Specifically, the ion conductivity is preferably $10^{-3}$ S/m or less, and more preferably $10^{-4}$ S/m or less. That is because, the cause of having a deterioration of the positive electrode (resin current collector and positive electrode active material layer) originates from an interface between the resin which forms the current collector on a surface of a resin current collector and the conductive filler. Accordingly, a certain oxidation reaction which is believed to be linked to deterioration does not occur if ions (electrolyte solution containing ions) are not present in that area (i.e., interface). As for the method for measuring the ion conductivity of the electron conductive layer, it is preferable that the electron conductive layer is sandwiched by a separator filled with those (for example, an electrolyte solution) which has an electron insulating property and ion permeability, so as to have a configuration in which only the ions can flow through the electron conductive layer, and then the ion conductivity is measured for that region. Specifically, it is possible that, after additionally disposing a Li metal electrode on the outer side of each separator, the ion conductivity can be calculated from the resistance in the presence or absence of the intermediate electron conductive layer by using an AC method or a DC method. In an actual case, it is also possible that number of the electron conductive layer is increased, and then calculation is made based on an increase obtained at that moment.

The oxidation resistance of the electron conductive layer at room temperature (25° C.) based on Li is preferably 4.2 V or more, and more preferably 4.3 V or more. That is because the electron conductive layer disposed at the interface between the resin current collector and positive electrode active material layer is strongly required to have oxidation resistance (corrosion resistance) from the viewpoint of preventing the deterioration reaction described above. It is excellent in that, by satisfying this constitution, the working effect of the electron conductive layer can be more significantly exhibited. The oxidation resistance of the electron conductive layer based on Li is 4.2 V or more, because the upper voltage limit of a common lithium ion battery based on Li is 4.2 V.

The oxidation resistance of the electron conductive layer is obtained by relative comparison with an Al foil current collector. For the constitution in which the electron conductive layer faces toward an electrode (positive electrode) (i.e., electron conductive layer is provided between the resin current collector and positive electrode active material layer), charging and discharging cycle is performed with common charging/discharging conditions by using a cell in which Li metal is used as a counter electrode. Herein, the charging and discharging conditions include 0.2 C CC-CV charging to 4.2 V for 10 hours at room temperature (25° C.) and 0.2 C CC discharging to 3.0 V, which correspond to 1 cycle, and this charging and discharging cycle is repeatedly performed. The decrease in capacity at that time is compared to the decrease in capacity of a cell with the same positive electrode active material layer in which Al foil is used for the current collector. When the decrease in capacity is lower than that of a cell with the same positive electrode active material layer in which Al foil is used for the current collector, it is determined that the oxidation resistance of the electron conductive layer used is 4.2 V. Thus, by changing the upper limit voltage during charging among the above charging and discharging conditions, the oxidation resistance range of the electron conductive layer can be determined. Furthermore, because the oxidation resistance of Al foil is not 4.2 V but is higher than 4.5 V if an electrolyte solution containing $LiPF_6$ or $LiBF_4$ is used, the electrolyte solution is first oxidized and decomposed in general. Thus, the Al foil is not included in the subject for comparison. If the current collector is oxidized and degraded, a dramatic decrease in capacity is yielded. With regard to the oxidation resistance, if there is no dramatic decrease in capacity even when charging and discharging is carried out by having that voltage as an upper limit, it can be said that there is oxidation resistance at least up to that voltage. On the contrary, without any oxidation resistance, a dramatic decrease in capacity will be shown if charging and discharging is carried out up to that voltage.

Materials of the electron conductive layer are not particularly limited as long as they are the materials having electron conductivity with low ion conductivity. Specifically, preferred are as follows: (1) a material containing p type conductive polymer, (2) a material containing a polymer consisting of a repeating unit containing electron withdrawing group and a conductive filler, and (3) a material mainly containing an epoxy resin and a conductive filler. When a surface of the resin current collector is covered with an electron conductive layer which consists of the above (1) material containing p type conductive polymer, the aforementioned object can be achieved and also the effect of this embodiment can be exhibited. Namely, as it becomes possible to achieve a layer which suppresses the deterioration reaction (i.e., oxidative side reaction on the conductive filler A in contact with an olefin-based resin) and also smoothly maintains an electronic contact between the resin current collector and positive electrode active material layer, the effect of this embodiment can be exhibited. Furthermore, in the p type conductive polymer, oxidation occurs in a potential range in which the positive electrode is used to yield electron conductivity. In addition, an n type conductive polymer is not selected from the viewpoint that it has an insulating property in oxidation state (neutral), and gives a highly resistant layer. There is also a reason that, when the electron conductive layer is formed of a material containing a resin and a conductive filler, if the resin itself is prepared as a resin consisting of a repeating unit containing electron withdrawing group as described above (2) so as not to have an occurrence of the aforementioned deterioration reaction, the above purpose can be achieved and also the effect of this embodiment can be exhibited. Namely, as it becomes possible to achieve a layer which suppresses the deterioration reaction (i.e., oxidative side reaction on the conductive filler A in contact with an olefin-based resin) and also smoothly maintains an electronic contact between the resin current collector and positive electrode active material layer, the effect of this embodiment can be exhibited. Furthermore, as the oxidation resistance increases, more stable performance can be obtained over the potential range for using the positive electrode. There is also a reason that, when a surface of the resin current collector is covered with an electron conductive layer which consists of the above (3) material mainly containing an epoxy resin and a conductive filler, the aforementioned object can be achieved and also the effect of this embodiment can be exhibited. Namely, the mechanism for having improved oxidation resistance by applying an epoxy resin coating layer as an electron conductive layer (i.e., mechanism for exhibiting the effect of oxidation resistance by epoxy resin coating) is believed to be the following although it remains rather unclear. For a resin to have oxidation and deterioration, it is considered that ions (anions) are required to arrive at an interface between the conductive filler A and the current collector resin on an electrode side surface of a resin current collector. If the coating resin has a three-dimensional cross-linked structure, it becomes difficult for the ions to permeate an epoxy resin coating layer and arrive at the surface of resin current collector. Because it is believed that, even when the epoxy resin on a surface in contact with an electrolyte solution is partially oxidized, further reaction in decomposed product is suppressed like inactivation phenomena in metal to yield an improvement, the effect of this embodiment can be effectively exhibited. Furthermore, as the oxidation resistance increases, higher stability can be obtained in a potential range in which the positive electrode is used. It is also believed that such effect can be promoted by introducing a functional group (electron withdrawing group or the like) having oxidation resistance to part of the molecular structure of epoxy resin or adding an additive with oxidation resistance to inside of epoxy resin. Hereinbelow, the conductive filler to be contained in the electron conductive layer is also referred to as the conductive filler B for the necessity of distinguishing it from the conductive filler to be contained in the resin current collector (i.e., conductive filler A).

Specifically, the above (1) p type conductive polymer is selected from materials which have p type conductivity but no conductivity in regard to ions used as a charge transfer medium. It is considered that those p type conductive polymers exhibit the conductivity as the conjugated polyene system forms an energy band. Representative examples of the p type conductive polymer which can be used include a polyene conductive polymer which is now under the progress of application to an electrolytic condenser or the like. Specific examples thereof include polyanilines, polypyrroles, polythiophenes (for example, polythiophene, halogenated polythiophene, polyalkylthiophene, poly(3-alkylthiophene) such as poly(3-methylthiophene), poly(3-ethylthiophene), poly(3-butylthiophene), poly(3- hexylthiophene), poly(3-octylthiophene), poly(3-dodecylthiophene), poly(dialkylthiophene), poly(3-carboxythiophene), poly(3-octyloxy-4-methylthiophene), poly(3,4-ethylenedioxythiophene), poly(3-(4-octylphenyl) thiophene), poly(3-methylthiophene-co-3'-octylthiophene), poly(3,4-ethylenedioxythiophene)-poly(styrene sulfonic acid), sodium poly(3-thiophene alkane sulfonic acid) or the like), polyacetylenes, and a mixture thereof. They may be used either singly or in combination of two or more types thereof. From the viewpoint of the p type electron conductivity and stable use in battery, polyanilines, polypyrroles, polythiophenes, and polyacetylenes are more preferable.

The reason for using the term "containing" for the above (1) p type conductive polymer is that materials other than p type conductive polymer may be also contained as long as it is within the range in which the working effect of this embodiment is not impaired. In that case, content of the p type conductive polymer as a major component is, relative to the whole amount of the electron conductive layer, 50% by mass or more, more preferably 70% by mass or more, even more preferably 90% by mass or more, and particularly preferably 100% by mass. As the content of the p type conductive polymer is within this range, the aforementioned purpose can be exhibited and the effect of this embodiment can be exhibited. Namely, as it becomes possible to achieve a layer which suppresses the deterioration reaction (i.e., oxidative side reaction on the conductive filler A in contact with an olefin-based resin) and also smoothly maintains an electronic contact between the resin current collector and positive electrode active material layer, the effect of this embodiment can be exhibited. Furthermore, as the content of the p type conductive polymer is within the above range, the electron conductivity can be obtained as the positive electrode is oxidized within a potential range for use. Furthermore, the durability, in particular, the charging and discharging cycle durability of an electrode can be further enhanced.

The materials other than the above (1) p type conductive polymer are not particularly limited, and a resin matrix (polymer material) used for a conventionally known resin current collector or other additives can be suitably used. Examples of the resin matrix (polymer material) include polyether nitrile (PEN), polyimide (PI), polyamide (PA), polyamideimide, polytetrafluoroethylene (PTFE), polyacrylonitrile (PAN), polymethyl acrylate (PMA), polymethyl methacrylate (PMMA), polyvinyl chloride (PVC), polyvinylidene fluoride (PVDF), polyvinylidene chloride, and a mixture thereof. They may be used either singly or in combination of two or more types thereof. Those materials have a very broad potential window, are stable in a broad range against both the positive electrode potential and negative electrode potential, and allow having high adhesiveness. The content of the resin matrix (polymer material) used for a conventionally known resin current collector is not particularly limited as long as it is within the range in which the working effect of this embodiment is not impaired.

Next, examples of the above (2) a material containing a polymer having a repeating unit containing electron withdrawing (attracting) group include (2a) mainly fluorine-based polymer, preferably, polymer having a repeating unit derived from vinylidene fluoride, and (2b) polymer having a repeating unit derived from carbonic acid ester (or having carbonic acid ester as a functional group). However, the polymer is not limited to those polymers at all. The electron withdrawing (attracting) group contained in the repeating unit of the above (2) polymer is not particularly limited, and examples thereof include —O$^+$R$_2$, —N$^+$R$_3$, —P$^+$R$_3$, —S$^+$R$_2$, a nitro group (—NO$_2$), —SO$_2$R, —SOR, —SO$_3$R, —NR$_2$, —OR, —SR, halogen (—F, —Cl, —Br, —I), a cyanogroup (—CN), =O, =NR, ≡N, ≡CR, and —C≡CR (herein, R represents an alkyl group, for example). As for the polymer having a repeating unit which contains an electron withdrawing (attracting) group (for example, CN group), it can be sufficiently used if the polymer has a film forming property and film stability in an electrolyte solution. Furthermore, an excellence is also found in that, by using the polymer having a repeating unit which contains an electron withdrawing (attracting) group, the conductive filler, in particular carbon materials become more stable. As for the polymer of the above (2), it is also possible that the aforementioned electron withdrawing (attracting) group is repeatedly contained in the unit, other than the polymers of (2a) and (2b) above. Examples thereof include polythiophenes added with halogen, nitro group, or cyano group as an electron withdrawing group (excellent in that it is stable and has conductivity), and polyacrylonitriles added with cyano group as an electron withdrawing group (excellent in that it does not swell). However, polymers of the above (2) are not limited to them. Hereinbelow, explanations are given for the polymers of (2a) and (2b) that are suitable among the polymer of above (2).

Examples of the fluorine-based polymer of above (2a), preferably, polymer having a repeating unit derived from vinylidene fluoride include a polyvinylidene fluoride-based polymer such as polyvinylidene fluoride (PVDF) or a copolymer thereof (e.g., vinylidene fluoride-trifluoroethylene copolymer (P(VDF-TrFE)), vinylidene fluoride-hexafluoropropylene copolymer (P(VDF-HFP)), vinylidene fluoride-hexafluoropropylene-tetrafluoroethylene copolymer (P(VDF-HFP-TFE)), vinylidene fluoride-pentafluoropropylene copolymer (P(VDF-PFP)), vinylidene fluoride-pentafluoropropylene-tetrafluoroethylene copolymer (P(VDF-PFP-TFE)), vinylidene fluoride-perfluoromethylvinyl ether-tetrafluoroethylene copolymer (P(VDF-PFMVE-TFE)), and vinylidene fluoride-chlorotrifluoroethylene copolymer (P(VDF-CTFE))). Those fluoride-based polymers allow forming of a stable film in an electrolyte solution and having high oxidation resistance. In particular, the polyvinylidene fluoride polymer material has, in addition to having stable film forming in an electrolyte solution and high oxidation resistance, high reliability and very broad potential window, is stable in a broad range against both of the positive electrode potential and negative electrode potential, and can have higher adhesiveness to the resin current collector and the positive electrode active material layer. Furthermore, in the above (2a), it is described as "mainly" a polymer having a repeating unit derived from vinylidene fluoride since a polymer or additives other than the polymer having a repeating unit derived from vinylidene fluoride can be also included within a range in which the working effect of this embodiment is not impaired.

The polymer other than the fluorine-based polymer of above (2a), preferably a polymer having a repeating unit derived from vinylidene fluoride is not particularly limited, and a resin matrix (polymer material) used for a conventionally known resin current collector can be suitably used. Specific examples thereof include polyether nitrile (PEN), polyimide (PI), polyamide (PA), polytetrafluoroethylene (PTFE), polyacrylonitrile (PAN), polymethyl acrylate (PMA), polymethyl methacrylate (PMMA), polyvinyl chloride (PVC), and a mixture thereof, because, similarly to the polyvinylidene fluoride-based polymer, those materials also have a very broad potential window, are stable in a broad range against both of the positive electrode potential and negative electrode potential, and can have higher adhesiveness. Content of the polymer other than the polymer having a repeating unit derived from vinylidene of above (2a) is not particularly limited as long as it is within a range in which the working effect of this embodiment is not impaired by it.

Furthermore, as the carbonic acid ester for deriving (i.e., to be contained in the unit) a repeating unit which consists of a polymer having a repeating unit derived from carbonic acid ester (i.e., having carbonic acid ester as a functional group) of above (2b), (meth)acrylic acid or the like can be also used. Specific examples of the (meth)acrylic acid ester include methyl (meth)acrylic acid, ethyl (meth)acrylic acid, n-propyl (meth)acrylic acid, i-propyl (meth)acrylic acid, n-butyl (meth)acrylic acid, i-butyl (meth)acrylic acid, n-amyl (meth)acrylic acid, i-amyl (meth)acrylic acid, hexyl (meth)acrylic acid, cyclohexyl (meth)acrylic acid, 2-ethylhexyl (meth)acrylic acid, n-octyl (meth)acrylic acid, nonyl (meth)acrylic acid, decyl (meth)acrylic acid, hydroxymethyl (meth)acrylic acid, hydroxyethyl (meth)acrylic acid, ethylene glycol (meth)acrylic acid, ethylene glycol di(meth) acrylic acid, propylene glycol di(meth)acrylic acid, trimethylolpropane tri(meth)acrylic acid, pentaerythritol tetra (meth)acrylic acid, dipentaerythritol hexa(meth)acrylic acid, allyl (meth)acrylic acid, and ethylene di(meth)acrylic acid, and it can be one or more types selected from them. Among them, one or more types selected from methyl (meth)acrylic acid, ethyl (meth)acrylic acid, and 2-ethylhexyl (meth) acrylic acid are preferably, and methyl (meth)acrylic acid is particularly preferable.

With regard to the polymer having a repeating unit derived from carbonic acid ester (i.e., having carbonic acid ester as a functional group) of the above (2b), when the electron conductive layer is formed by using a material containing a polymer (resin) and a conductive filler, if the resin itself is formed of the polymer having a repeating unit derived from carbonic acid ester (i.e., having carbonic acid ester as a functional group) of the above (2b) so that the aforementioned deterioration reaction does not occur, the aforementioned object can be achieved and the effect of this embodiment can be effectively exhibited. Namely, a layer which suppresses the above deterioration reaction (i.e., oxidative side reaction on the conductive filler A in contact with the olefin-based resin) and also smoothly maintains an electronic contact between the resin current collector and positive electrode active material layer can be achieved, and thus the effect of this embodiment can be effectively exhibited. Furthermore, by covering a surface of the resin current collector containing the olefin-based resin and the conductive filler A with an electron conductive layer which contains the polymer having a repeating unit derived from carbonic acid ester (i.e., having carbonic acid ester as a functional group) of the above (2b) and the conductive filler B, the oxidation resistance is enhanced so that greater stability can be obtained over the potential range in which the positive electrode is used.

It is also possible that the polymer having a repeating unit derived from carbonic acid ester (i.e., having carbonic acid ester as a functional group) of the above (2b) is a high-molecular weight compound (polymer) which consists only of a repeating unit derived from carbonic acid ester (i.e., having carbonic acid ester as a functional group). Furthermore, it can be also a high-molecular weight compound (copolymer) which has a repeating unit derived from other monomers that can copolymerize with the aforementioned compound in addition to the repeating unit derived from carbonic acid ester (i.e., having carbonic acid ester as a functional group).

Examples of other monomers include an α,β-unsaturated nitrile compound, an unsaturated carbonic acid (acrylic acid or the like), a conjugated diene compound, an aromatic vinyl compound, and other unsaturated monomers.

The polymer other than the polymer having a repeating unit derived from carbonic acid ester (i.e., having carbonic acid ester as a functional group) of the above (2b) is not particularly limited. For example, a resin matrix (polymer material) used for a conventionally known resin current collector can be suitably used. Specific examples thereof include polyether nitrile (PEN), polyimide (PI), polyamide (PA), polytetrafluoroethylene (PTFE), styrene butadiene rubber (SBR), polyacrylonitrile (PAN), polymethyl acrylate (PMA), polymethyl methacrylate (PMMA), polyvinyl chloride (PVC), polyvinylidene fluoride, and a mixture thereof, because those materials also have a very broad potential window, are stable in a broad range against both of the positive electrode potential and negative electrode potential, and can have higher adhesiveness. Content of the polymer other than the polymer having a repeating unit derived from carbonic acid ester (i.e., having carbonic acid ester as a functional group) of the above (2b) is not particularly limited as long as it is within a range in which the working effect of this embodiment is not impaired by it. Furthermore, in the above (2b), it is described as "mainly" a polymer having a repeating unit which has carbonic acid ester as a functional group, because as long as it is within a range in which the working effect of this embodiment is not impaired, a polymer other than the polymer having a repeating unit derived from carbonic acid ester (i.e., having carbonic acid ester as a functional group) can be also contained.

Next, the above (3) epoxy resin, in particular, the epoxy resin used as a resin matrix (polymer material) for forming a three-dimensional cross-linked network, is not particularly limited, and various epoxy resins that are conventionally known can be used. Examples of the epoxy resin include those obtained by a reaction (curing) of a resin composition A which contains an epoxy resin in liquid phase at room temperature and/or a crystalline bifunctional epoxy resin. Examples of the epoxy resin in liquid phase which is commercially available include "jER828EL", "YL980" (bisphenol A type epoxy resin) manufactured by Mitsubishi Chemical Corporation, "jER806H", "YL983U" (bisphenol F type epoxy resin) manufactured by Mitsubishi Chemical Corporation, "RXE21" (hydrogenated bisphenol A type epoxy resin) manufactured by Mitsubishi Chemical Corporation, "871", "191P" (glycidyl ester type epoxy resin) manufactured by Mitsubishi Chemical Corporation, "604", "630LSD" (glycidylamine type epoxy resin) manufactured by Mitsubishi Chemical Corporation, "HP4032", "HP4032D" (naphthalene type bifunctional epoxy resin) manufactured by DIC Corporation, "PB-3600" (epoxy resin with butadiene structure) manufactured by Daicel Chemical Industries, Ltd., CELLOXIDE "2021P", "2081", "3000" (alicyclic epoxy resin) manufactured by Daicel Chemical Industries, Ltd., and "ZX-1658" (cyclohexane dimethanol type epoxy resin) manufactured by Tohto Kasei Co., Ltd. Examples of the crystalline bifunctional epoxy resin which is commercially available include "NC3100" (bifunctional biphenyl type epoxy resin rich product) manufactured by Nippon Kayaku Co., Ltd., "YX4000H", "YL6121" (biphenyl type epoxy resin) manufactured by Mitsubishi Chemical Corporation, "YX8800" (anthracene skeleton-containing type epoxy resin) manufactured by Mitsubishi Chemical Corporation, and "YDC-1312", "YSL V-80XY", "YSL V-120TE", "ZX-1598A" manufactured by Tohto Kasei Co., Ltd. Furthermore, from the viewpoint of lowering the dielectric tangent, it is preferable to use a copolymer of styrene and glycidyl methacrylate, and specific examples thereof include "MARPROOF G-0115S", "MARPROOF G-0130S-P", "MARPROOF G-0150M", "MARPROOF G-0250S", "MARPROOF G-1005S", "MARPROOF G-1005SA", "MARPROOF G-1010S", "MARPROOF G-2050M", "MARPROOF G-01100", and "MARPROOF G-017581" manufactured by NOF Corporation.

In the case of using a product which is obtained by a reaction (curing) of an epoxy resin in liquid phase at room temperature and/or a crystalline bifunctional epoxy resin, content of the epoxy resin in liquid phase at room temperature and/or crystalline bifunctional epoxy resin is not particularly limited. Relative to 100% by mass of the non-volatiles in a resin composition containing the epoxy resin in liquid phase at room temperature and/or crystalline bifunctional epoxy resin, the content is preferably 10 to 99% by mass, and more preferably 20 to 95% by mass.

It is preferable that the above epoxy resin curing agent (polymerization initiator or cross-linking agent) is included in the resin composition A. The polymerization initiator (curing agent or cross-linking agent) is not particularly limited, and various polymerization initiators that are conventionally known in the field can be suitably used. Examples thereof include "SANAID SI-60" (cation polymerization initiator (curing agent or cross-linking agent)), "SANAID SI-80", "SANAID SI-100", "SANAID SI-60L", "SANAID SI-80L", "SANAID SI-100L", "SANAID SI-150L" manufactured by Sanshin Chemical Industry Co., Ltd., "CPI-100P" (photocation polymerization initiator (curing agent or cross-linking agent)), "CPI-110P", "CPI-101A" manufactured by San-Apro Limited, "ADEKAOPTOMER-CP-66" (thermal cation polymerization initiator (curing agent or cross-linking agent)), "ADEKAOPTOMER-CP-77", "ADEKAOPTOMER-SP-150" (photocation polymerization initiator (curing agent or cross-linking agent)), "ADEKAOPTOMER-SP-152", "ADEKAOPTOMER-SP-170", "ADEKAOPTOMER-SP-172" manufactured by Adeka Corporation, and "CI-2064" (photocation polymerization initiator(curing agent or cross-linking agent)), "CI-2639", "CI-2624", "CI-2481" manufactured by Nippon Soda Co., Ltd.

In addition to the above, a product which is obtained by a reaction (curing) of a resin composition B containing bisphenol AF type epoxy resin ((B) component) with one or more kinds of a curing agent selected from a cyanate ester curing agent and an active ester curing agent ((A) component) can be exemplified.

The cyanate ester curing agent is not particularly limited, and examples thereof include novolac type (phenol novolac type, alkylphenol novolac type, or the like) cyanate ester curing agent, dicyclopentadiene type cyanate ester curing agent, bisphenol type (bisphenol A type, bisphenol F type, bisphenol S type, or the like) cyanate ester curing agent, and a prepolymer obtained by partial triazination thereof. They may be used either singly or in combination of two or more types. The weight average molecular weight of the cyanate ester curing agent is, although not particularly limited, preferably 500 to 4500, and more preferably 600 to 3000.

Specific examples of the cyanate ester curing agent include a bifunctional cyanate resin such as bisphenol A dicyanate, polyphenol cyanate(oligo(3-methylene-1,5-phenylenecyanate), 4,4'-methylenebis(2,6-dimethylphenylcyanate), 4,4'-ethylidenediphenyldicyanate, hexafluorobisphenol A dicyanate, 2,2-bis(4-cyanate)phenylpropane, 1,1-bis(4-cyanatephenylmethane), bis(4-cyanate-3,5-dimethylphenyl)methane, 1,3-bis(4-cyanatephenyl-1-(methylethylidene))benzene, bis(4-cyanatephenyl)thioether, or bis(4-cyanatephenyl)ether, phenol novolac, cresol novolac, a polyfunctional cyanate resin which is derived from a phenol resin having dicyclopentadiene structure, and a prepolymer obtained by partial triazination thereof. They may be used either singly or in combination of two or more types.

Examples of the cyanate ester curing agent which is commercially available include a phenol novolac type polyfunctional cyanate ester curing agent represented by the following formula (1) (manufactured by Lonza Japan, PT30, cyanate equivalents: 124), a prepolymer obtained as a trimer by triazination of part or all of bisphenol A dicyanate represented by the following formula (2) (manufactured by Lonza Japan, BA230, cyanate equivalents: 232), and a cyanate ester curing agent represented by the following formula (3) containing dicyclopentadiene structure (manufactured by Lonza Japan, DT-4000, DT-7000).

[Chem. 1]

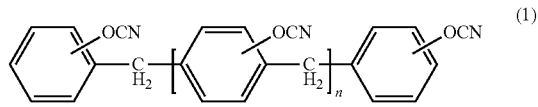

In the formula (1), n as a mean value represents any number (preferably 0 to 20).

[Chem. 2]

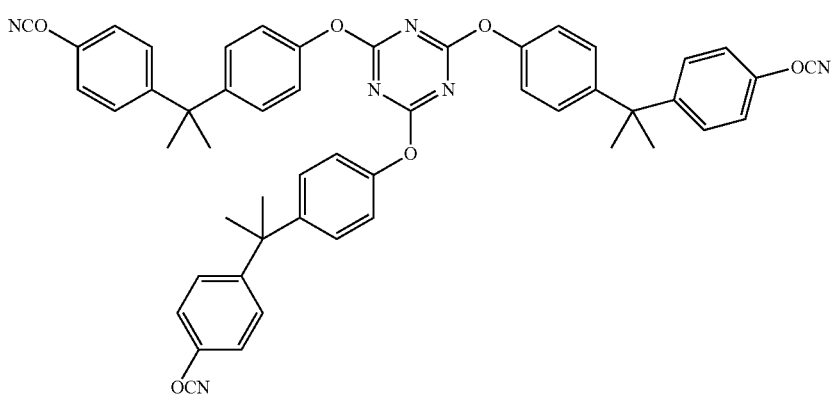

[Chem. 3]

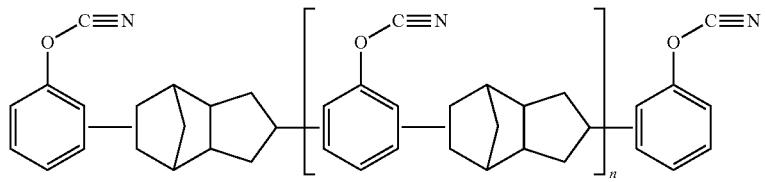

(3)

In the formula (3), n as a mean value represents number of 0 to 5.

The active ester curing agent is not particularly limited, and it indicates an agent which has an ester group with high reaction activity and a curing action for epoxy resin, such as phenol ester compound, thiophenol ester compound, N-hydroxyamine ester compound, and esterified compound of heterocyclic hydroxy compound. The active ester curing agent is, although not particularly limited, preferably a compound which has two or more active ester groups in one molecule. More preferably, it is an aromatic compound which has two or more active ester groups in one molecule that is obtained from a compound having polyhydric carbonic acid and an aromatic compound having a phenolic hydroxy group. Even more preferably, it is an aromatic compound which has two or more active ester groups in a molecule of the aromatic compound that is obtained from a compound having at least two polyhydric carbonic acids in one molecule and an aromatic compound having a phenolic hydroxy group. It can be either linear or multi-branched. Furthermore, if the compound having at least two carbonic acids in one molecule is a compound including aliphatic chains, the compatibility with epoxy resin can be enhanced. If the compound having at least two carbonic acids in one molecule is a compound having an aromatic ring, the heat resistance can be enhanced. In particular, from the viewpoint of the heat resistance or the like, an active ester curing agent which is obtained from a carbonic acid compound and a phenol compound or a naphthol compound is preferable. Specific examples of the carbonic acid compound include benzoic acid, acetic acid, succinic acid, maleic acid, itaconic acid, phthalic acid, isophthalic acid, terephthalic acid, and pyromellitic acid. In particular, from the viewpoint of the heat resistance, succinic acid, maleic acid, itaconic acid, phthalic acid, isophthalic acid, and terephthalic acid are preferable. Isophthallic acid and terephthalic acid are more preferable. Specific examples of the phenol compound or naphthol compound include hydroquinone, resorcin, bisphenol A, bisphenol F, bisphenol S, phenolphthaline, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, fluoroglucine, benzenetriol, dicyclopentadienyldiphenol, and phenol novolac. Among them, from the viewpoint of the heat resistance and solubility, bisphenol A, bisphenol F, bisphenol S, methylated bisphenol A, methylated bisphenol F, methylated bisphenol S, catechol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, fluoroglucine, benzenetriol, dicyclopentadienyldiphenol, and phenol novolac are preferable. Catechol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, fluoroglucine, benzenetriol, dicyclopentadienyldiphenol, and phenol novolac are more preferable. 1,5-Dihydroxynaphthalene, 1,6-dihydroxynaphthalene, 2,6-dihydroxynaphthalene, dihydroxybenzophenone, trihydroxybenzophenone, tetrahydroxybenzophenone, dicyclopentadienyldiphenol, and phenol novolac are even more preferable. Dihydroxybenzophenone, trihydroxybenzophenone, tetrahydroxybenzophenone, dicyclopentadienyldiphenol, and phenol novolac are still even more preferable. Dicyclopentadienyldiphenol and phenol novolac are particularly preferable, and dicyclopentadienyldiphenol is more particularly preferable. They may be used either singly or in combination of two or more types thereof.

The method for producing an active ester curing agent is not particularly limited, and the production can be made by a known method. Specifically, it can be obtained by a condensation reaction between a carbonic acid compound and a hydroxy compound. Furthermore, as the active ester curing agent, the active ester curing agent described in JP 2004-277460 A can be used, and a commercially available product can be also used.

As for the commercially available active ester curing agent, those containing dicyclopentadienyldipheno structure, acetylated product of phenol novolac, benzoylated product of phenol novolac, or the like are preferable. In particular, those containing dicyclopentadienyldipheno structure are more preferable. Specific examples thereof include HPC-8000-65T (manufactured by DIC Corporation, active group equivalents of about 223), EXB9460S-65T (manufactured by DIC Corporation, active group equivalents of about 223), DC808 (manufactured by Mitsubishi Chemical Corporation, active group equivalents of about 149), YLH1026 (manufactured by Mitsubishi Chemical Corporation, active group equivalents of about 200), YLH1030 (manufactured by Mitsubishi Chemical Corporation, active group equivalents of about 201), and YLH1048 (manufactured by Mitsubishi Chemical Corporation, active group equivalents of about 245). Among them, EXB9460S is preferred from the viewpoint of the storage stability of varnish and thermal expansion rate of a cured product.

The content of the (A) component in the resin composition is not particularly limited. However, the upper limit of the content of the (A) component in the resin composition is, relative to 100% by mass of the non-volatiles in the resin composition, preferably 50% by mass, more preferably 40% by mass, even more preferably 30% by mass, and still even more preferably 25% by mass. On the other hand, the lower limit of the content of the (A) component in the resin composition is, relative to 100% by mass of the non-volatiles in the resin composition, preferably 2% by mass, more preferably 5% by mass, and even more preferably 8% by mass.

The bisphenol AF type epoxy resin as the (B) component is not particularly limited, and those represented by the formula (4) can be used, for example. In particular, a 4,4'-[2,2,2-trifluoro-1-(trifluoromethyl)ethylidene]bisphenol type epoxy resin can be mentioned. They may be used either singly or in combination of two or more types thereof, and a commercially available product can be also used. Examples of the commercially available product of bisphenol AF type epoxy resin include YL7723 (manufactured by Mitsubishi Chemical Corporation).

[Chem. 4]

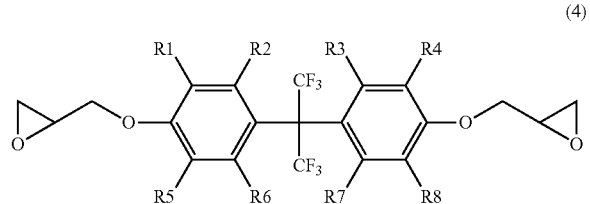

(4)

In the formula (4), R1 to R8 represent hydrogen, fluorine, or an alkyl group, and R1 To R8 are preferably hydrogen.

The content of the bisphenol AF type epoxy resin in the resin composition is not particularly limited. However, the upper limit of the content of the bisphenol AF type epoxy resin in the resin composition is, relative to 100% by mass of the non-volatiles in the resin composition, preferably 40% by mass, more preferably 30% by mass, and even more preferably 20% by mass. On the other hand, the lower limit of the content of the bisphenol AF type epoxy resin in the resin composition is, relative to 100% by mass of the non-volatiles in the resin composition, preferably 1% by mass, more preferably 3% by mass, and even more preferably 5% by mass.

The ratio of total equivalents of the ester equivalents in the active ester curing agent and the cyanate equivalents in the cyanate ester curing agent, and the epoxy equivalents of the bisphenol AF type epoxy resin is preferably 1:0.4 to 1:2, and more preferably 1:0.7 to 1:1.6.

By additionally containing a curing promoter in the resin composition B, the (A) component, epoxy resin, and the like can be efficiently cured. The curing promoter is not particularly limited, and examples thereof include a metal-based curing promoter, an imidazole-based curing promoter, and an amine-based curing promoter. They may be used either singly or in combination of two or more types thereof.

The metal-based curing promoter is not particularly limited, and examples thereof include an organic metal complex or an organic metal salt of a metal including cobalt, copper, zinc, iron, nickel, manganese, and tin. Specific examples of the organic metal complex include an organic cobalt complex such as cobalt (II) acetylacetonate or cobalt (III) acetylacetonate, an organic copper complex such as copper (II) acetylacetonate, organic zinc complex such as zinc (II) acetylacetonate, an organic iron complex such as iron (III) acetylacetonate, an organic nickel complex such as nickel (II) acetylacetonate, and an organic manganese complex such as manganese (II) acetylacetonate. Examples of the organic metal salt include zinc octylic acid, tin octylic acid, zinc naphthenic acid, cobalt naphthenic acid, tin stearic acid, and zinc stearic acid. As for the metal-based curing promoter, cobalt (II) acetylacetonate, cobalt (III) acetylacetonate, zinc (II) acetylacetonate, zinc naphthenic acid, and iron (III) acetylacetonate are preferable from the viewpoint of the curing property and solubility in solvent. Cobalt (II) acetylacetonate and zinc naphthenic acid are particularly preferable. They may be used either singly or in combination of two or more types thereof.

With regard to the upper limit of the content of the metal-based curing promoter, from the viewpoint of the storage stability of the resin composition B or the like, the content of the metal based on the metal-based curing promoter is preferably 500 ppm, and more preferably 200 ppm relative to 100% by mass of the non-volatiles in the resin composition. On the other hand, with regard to the lower limit of the content of the metal-based curing promoter, the content of the metal based on the metal-based curing promoter is preferably 20 ppm, and more preferably 30 ppm relative to 100% by mass of the non-volatiles in the resin composition.

The imidazole-based curing promoter is not particularly limited, and examples thereof include an imidazole compound such as 2-methylimidazole, 2-undecylimidazole, 2-heptadecylimidazole, 1,2-dimethylimidazole, 2-ethyl-4-methylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazineisocaynuric acid adduct, 2-phenylimidazoleisocaynuric acid adduct, 2-phenyl-4,5-dihydroxymethylimidazole, 2-phenyl-4-methyl-5hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline and an adduct of an imidazole compound and an epoxy resin. They may be used either singly or in combination of two or more types thereof.

The amine-based curing promoter is not particularly limited, and examples thereof include an trialkylamine such as triethylamine or tributylamine, and an amine compound such as 4-dimethylaminopyridine, benzyldimethylamine, 2,4,6,-tris(dimethylaminomethyl)phenol, 1,8-diazabicyclo(5,4,0)-undecene (hereinbelow, abbreviated as DBU). They may be used either singly or in combination of two or more types thereof.

Content of the curing promoter like the imidazole-based curing promoter and amine-based curing promoter is not particularly limited. However, relative to 100% by mass of the non-volatiles in the resin composition, it is preferably in the range of from 0.005 to 1% by mass, and more preferably in the range of from 0.01 to 0.5% by mass. If it is less than 0.005% by mass, there is a tendency that curing becomes slow and longer time is required for thermal curing. On the other hand, if it is more than 1% by mass, there is a tendency that the storage stability of the resin composition becomes lower and thermal expansion rate becomes higher.

It is possible for the resin composition A or B to contain an epoxy resin (excluding the bisphenol AF type epoxy resin). Examples of the epoxy resin include, although not particularly limited, bisphenol A type epoxy resin, bisphenol F type epoxy resin, bisphenol S type epoxy resin, phenol novolac type epoxy resin, alkylphenol novolac type epoxy resin, biphenyl type epoxy resin, biphenyldimethylene type epoxy resin, aralkyl type epoxy resin, dicyclopentadiene type epoxy resin, naphthalene type epoxy resin, naphthol type epoxy resin, naphthylene ether type epoxy resin, an epoxide of a condensate between phenols and aromatic aldehyde having phenolic hydroxyl group, copolymer of styrene and glycidyl methacrylate, biphenylaralkyl type epoxy resin, fluorene type epoxy resin, xanthene type epoxy resin, and triglycidyl isocyanurate. They may be used either singly or in combination of two or more types thereof.

By further containing a thermoplastic resin in the resin composition A or B, mechanical strength of a cured product can be improved. Examples of such polymer compound include a phenoxy resin, a polyvinylacetal resin, a polyimide resin, a polyamideimide resin, a polyether imide resin, a polysulfon resin, a polyether sulfon resin, a polyphenylene ether resin, a polycarbonate resin, a polyether ether ketone resin, and a polyester resin. They may be used either singly or in combination of two or more types thereof. Among them, a phenoxy resin and a polyvinylacetal resin are preferable, and a phenoxy resin is more preferable.

Examples of the phenoxy resin include a resin having at least one skeleton selected from bisphenol A skeleton, bisphenol F skeleton, bisphenol S skeleton, bisphenol AF skeleton, bisphenol acetophenone skeleton, novolac skeleton, biphenyl skeleton, fluorene skeleton, dicyclopentadiene skeleton, norbornene skeleton, naphthalene skeleton, anthracene skeleton, adamantan skeleton, terpene skeleton, trimethylcyclohexane skeleton, and skeleton of glycidyl methacrylate copolymer. Among them, from the viewpoint of lowering the dielectric tangent and lowering the linear expansion coefficient, a phenoxy resin having bisphenol AF skeleton is preferable. They may be used either singly or in combination of two or more types thereof. The terminal of a phenoxy resin can be any functional group of a phenolic hydroxyl group and an epoxy group. Examples of a commercially available product thereof include YL7383, YL7384 (bisphenol AF skeleton-containing phenoxy resin) manufactured by Mitsubishi Chemical Corporation, 1256, 4250 (bisphenol A skeleton-containing phenoxy resin) manufactured by Mitsubishi Chemical Corporation, YX8100 (bisphenol S skeleton-containing phenoxy resin) manufactured by Mitsubishi Chemical Corporation, YL6954 (bisphenol acetophenone skeleton-containing phenoxy resin) manufactured by Mitsubishi Chemical Corporation, FX280, FX293 manufactured by Totoh Kasei Co., Ltd., and YL7553, YL6794, YL7213, YL7290, YL7482 manufactured by Mitsubishi Chemical Corporation.

Specific examples of the polyvinylacetal resin include Denka Butyral 4000-2, 5000-A, 6000-C, 6000-EP manufactured by Denki Kagaku Kogyo K.K., and S-Lect BH series, BX series, KS series, BL series, BM series manufactured by Sekisui Chemical Co., Ltd. They may be used either singly or in combination of two or more types thereof.

Specific examples of the polyimide resin include polyimide "RIKA COAT SN20" and "RIKA COAT PN20" manufactured by New Japan Chemical Co., Ltd. Further examples thereof include modified polyimide such as linear polyamide obtained by reacting polybutadiene with bifunctional hydroxyl terminal group, a diisocyanate compound, and tetrabasic acid anhydride (i.e., those described in JP 2006-37083 A) and polysiloxane skeleton-containing polyimide (those described in JP 2002-12667 A and JP 2000-319386 A). Specific examples of the polyamideimide resin include polyamideimide "VYLOMAX HR11NN" and "VYLOMAX HR16NN" manufactured by Toyo Boseki K.K. Further examples thereof include modified polyamideimide such as polysiloxane skeleton-containing polyamideimide "KS9100", "KS9300" manufactured by Hitachi Chemical Co., Ltd. Specific examples of the polyether sulfon resin include polyether sulfon "PES5003P" manufactured by Sumitomo Chemical Company. Specific examples of the polysulfon resin include polysulfon "P1700", "P3500" manufactured by Solvay Advanced Polymers. They may be used either singly or in combination of two or more types thereof.

The weight average molecular weight of a thermoplastic resin is not particularly limited. However, it is preferably in the range of from 5000 to 200000. Furthermore, the weight average molecular weight is measured by gel permeation chromatography (GPC) method (converted in polystyrene). The weight average molecular weight based on GPC method can be obtained by using LC-9A/RID-6A manufactured by Shimadzu Corporation as a measurement apparatus, Shodex K-800P/K-804L/K-804L manufactured by Showa Denko K.K. as a column, and chloroform as a mobile phase, carrying out the measurement at column temperature of 40° C., and performing the calculation on the basis of calibration curve of standard polystyrene.

In a case in which a thermoplastic resin is blended in the resin composition, content of the thermoplastic resin is not particularly limited. However, relative to 100% by mass of the non-volatiles in a resin composition, the content is preferably 0.1 to 10% by mass, and more preferably 0.5 to 5% by mass.

It is preferable to use the above (3) epoxy resin, in particular, a polymer like the above epoxy resin as a resin matrix (polymer material) for forming a 3-dimensional cross-linked network from the viewpoint of having stability against oxidation and reduction in a potential range in which the positive electrode is used in an electrolyte solution.

With regard to the polymer like the above (3) epoxy resin, when the electron conductive layer is formed by using a material containing a polymer (resin) and a conductive filler, by using the above (3) epoxy resin as the resin itself so as not to have an occurrence of the deterioration reaction, the aforementioned purpose can be achieved and the effect of the present invention can be effectively exhibited. Namely, it is possible to achieve an electron conductive layer which can suppress the deterioration reaction (i.e., oxidative side reaction on the conductive filler A that is in contact with an olefin-based resin) and maintain smoothly the electronic between the current collector and the positive electrode active material layer, and also the effect of this embodiment can be effectively exhibited. Furthermore, by covering a surface of the resin current collector containing the olefin-based resin and the conductive filler A with an electron conductive layer which contains the above (3) epoxy resin and the conductive filler B, the oxidation resistance is enhanced so that greater stability can be obtained over the potential range in which the positive electrode is used. Furthermore, the mechanism for having exhibition of the oxidation resistance by epoxy resin coating is as described above. Furthermore, in the above (3), it is described as "mainly" an epoxy resin since a polymer other than the epoxy resin can be also included within a range in which the working effect of this embodiment is not impaired.

The conductive filler B of the above (2), (2a), (2b) and (3) is selected from materials having conductivity (electron conductivity). Preferred is use of a material having no conductivity in regard to ions that are used as a charge transfer medium from the viewpoint of suppressing ion permeation in the electron conductive layer. Furthermore, the conductive filler B is selected from materials which can endure the positive electrode potential and negative electrode potential to be applied.

As for the conductive filler B, those that are the same as the above conductive filler A (same materials, shape, average particle diameter, and average fiber length in the case of fiber shape) can be used. Herein, the descriptions are omitted to avoid redundant explanations.

Furthermore, as for the conductive filler B used for the electron conductive layer, those that are the same as the above conductive filler A can be used. However, from the viewpoint of having fewer problems of contact resistance like hardly having an occurrence of an insulating oxidized film on the surface and low contact resistance between fillers, a carbon-based filler is preferable, in particular. It is believed to be due to the reason that, as carbon has a film thickness of one surface functional group even after oxidation, permeation of an electron is possible based on tunnel effect at such film thickness. Examples of the carbon-based filler include at least one kind selected from a group consisting of acetylene black (AB), carbon black, Vulcan, Black Pearls, carbon nanofiber, Ketjen black, carbon nanotube, carbon nanohorn, carbon nanoballoon, hard carbon, graphite, and fullerene. These carbon-based fillers have a very broad potential window, are stable against any of the positive electrode potential and negative electrode potential, and also have excellent conductivity. Furthermore, because the carbon-based fillers have very light weight, a mass increase is kept at the minimum level. Furthermore, because the carbon-based fillers are frequently used as a conductive aid of an electrode, the contact resistance becomes very low even when they are in contact with a conductive aid as they are the same materials. Furthermore, when the carbon-based fillers are used as the conductive filler B, it is also possible that by performing a hydrophobic treatment on a surface of the carbon-based fillers, the electrolyte (solution electrolyte) affinity is lowered so as to create a state in which the electrolyte (solution electrolyte) cannot easily permeate into the voids of the resin current collector. Furthermore, excellent corrosion resistance (oxidation resistance) can be obtained and the durability of an electrode can be further enhanced.

As for the average particle diameter (i.e., average particle diameter of primary particles) of the conductive filler B, those in the same range as the conductive filler A can be used. In view of the electric properties of a battery, it is preferably in the range from 0.01 to 10 μm, and more preferably 0.01 to 1 μm or so. Furthermore, the average particle diameter of the conductive filler B (i.e., average particle diameter of a secondary particle (aggregate)) is not particularly limited if there is no defect in the electron conductive layer. From the viewpoint that the size of the aggregate (average particle diameter) is preferably 0.1 μm or more and less than the thickness of the electron conductive layer (~20 μm), it is in the range of from 0.02 to 20 μm. When an aggregate (agglomerated product) like acetylene black is used, in particular, it is preferably in the range of from 30 to 50 nm (0.03 to 0.05 μm) for easily having the formation of a three-dimensional electron network.

In the above (2), (2a), (2b) and (3), the content of the polymer (resin) having a repeating unit containing electron withdrawing group in the electron conductive layer is, relative to the total amount of the electron conductive layer, 10 to 95% by mass, and more preferably 15 to 90% by mass. As the resin content in the electron conductive layer is within the above range, it is possible not to have an occurrence the deterioration reaction if the electron conductive layer is formed by using a material containing the resin and conductive filler, and thus the aforementioned purpose can be achieved and the effect of this embodiment can be exhibited. Namely, as it becomes possible to achieve a layer which suppresses the deterioration reaction (i.e., oxidative side reaction on the conductive filler A in contact with an olefin-based resin) and also smoothly maintains an electronic contact between the resin current collector and positive electrode active material layer, the effect of this embodiment can be exhibited. Furthermore, the oxidation resistance is enhanced so that greater stability can be obtained over the potential range in which the positive electrode is used.

In the above (2), (2a), (2b) and (3), content of the conductive filler B in the electron conductive layer is, from the viewpoint of providing the electron conductive layer with conductivity (electron conductivity) and suppressing ion permeation, 5 to 85% by mass, and more preferably 10 to 80% by mass relative to the whole amount of the electron conductive layer. As the content of the conductive filler B is within the above range, a layer which suppresses the deterioration reaction (i.e., oxidative side reaction on the conductive filler A in contact with an olefin-based resin) and also smoothly maintains an electronic contact between the resin current collector and positive electrode active material layer is achieved so that the effect of this embodiment can be exhibited. Furthermore, by adding the conductive filler B with the content in the above range to the polymer (resin) having a repeating unit containing electron withdrawing group or to the epoxy resin, the electron conductive layer can be provided with sufficient conductivity while suppressing the mass increase of the electron conductive layer.

The reason for using the term "containing" for the above (2) polymer having a repeating unit containing electron withdrawing group, or (3) epoxy resin and a conductive filler B is that materials other than the conductive filler B may be also contained as long as it is within the range in which the working effect of this embodiment is not impaired. In that case, examples of other materials include various additives. Examples of the additives include polypropylene modified with carbonic acid such as polypropylene modified with maleic anhydride. Addition amount of the additives is not particularly limited as long as it is within the range in which the working effect of this embodiment is not impaired. However, relative to 100 parts by mass of the total of the above resin and conductive filler B, it is preferably 1 to 25 parts by mass.

Thickness of the electron conductive layer is preferably in the range of from 10 to 20 μm. The electron conductive layer thickness of 20 μm or less is favorable in that, in such case, the internal battery resistance is suppressed and a decrease in volume energy density of a battery is suppressed. The electron conductive layer thickness of 10 μm or more is favorable in that, in such case, an occurrence of film defect is suppressed and a progress of deterioration due to slight ion conductivity is effectively prevented.

The method for producing the electron conductive layer is not particularly limited, and the production can be made in the same manner as the method for producing a common positive electrode active material layer. Namely, mention can be made of forming the electron conductive layer in which a resin as the material of (1), a resin as the material of (2), the conductive filler B, and each component of various additives which may be added if necessary are added and mixed in a viscosity modifying solvent to prepare a slurry for forming an electron conductive layer, and the slurry is applied on a resin current collector followed by drying (e.g., vacuum drying at suitable temperature (80° C.

or so)). If necessary, after drying, the electron conductive layer formed on the resin current collector may be rolled by using a heat pressing machine or the like. For example, as for the method for producing the electron conductive layer in which the above (2a) of mainly a polymer consisting of a repeating unit containing carbonic acid ester as a functional group (polyvinylidene fluoride) and the conductive filler B (acetylene black) are used, the production can be made according to the following. First, an NMP solution in which PVDF is dissolved at certain concentration, NMP, and acetylene black are admixed in a certain amount to prepare a slurry for forming the electron conductive layer. The slurry is applied on a surface of the resin current collector using an applicator while having a certain gap, and by vacuum drying and removing solvent under heating, the electron conductive layer with desired thickness can be obtained. As for the method for producing the electron conductive layer in which the above (2b) of epoxy resin and the conductive filler B (acetylene black) are used, the production can be made according to the following. First, an epoxy resin in liquid phase, a crystalline bifunctional epoxy resin, methyl ethyl ketone, acetylene black, and a curing agent are admixed in a certain amount to prepare a slurry for forming the electron conductive layer. The slurry is applied on a surface of the resin current collector using an applicator while having a certain gap, and by vacuum drying and removing solvent under heating, the electron conductive layer with desired thickness can be obtained.

For the positive electrode, the slurry for forming the electron conductive layer is applied on a resin current collector to form a coating film on the current collector, and if necessary by heat press, the electron conductive layer is formed on the resin current collector. Furthermore, it is preferable that the positive electrode is obtained by applying the positive electrode slurry on this electron conductive layer followed by drying to produce the positive electrode active material layer. With such structure, the conductive filler A or B in the resin current collector or electron conductive layer can more easily contact the resin component, and thus the contact resistance is further lowered, and the durability, in particular, the charging and discharging cycle durability of an electrode, can be further enhanced.

Furthermore, it is also possible to have a structure in which at least part of the conductive filler A or B is inserted in a surface of the resin current collector, electron conductive layer, or positive electrode active material layer. With such structure, the conductive filler A or B in the resin current collector or electron conductive layer can more easily contact other components in the resin current collector, electron conductive layer, or positive electrode active material layer, the contact resistance is further lowered, and thus the durability, in particular, the charging and discharging cycle durability of an electrode can be further enhanced.

Furthermore, for the positive electrode, it is also possible that the positive electrode active material layer is prepared on a substrate having a release property (such as PET film), the slurry for forming the electron conductive layer is applied on a resin current collector followed by drying (e.g., vacuum drying at suitable temperature (80° C. or so)) to produce an electron conductive layer, and they are laminated (attached) to produce the positive electrode. The positive electrode can be also obtained by laminating (attaching) them. The substrate having a release property can be removed by peeling after production of a positive electrode. The irregularities of contact resistance in a plane can be also reduced by these methods. Preferably, applying the slurry for forming the electron conductive layer on the resin current collector followed by drying (e.g., vacuum drying at suitable temperature (80° C. or so)) to produce an electron conductive layer and forming the positive electrode active material layer by additionally applying the positive electrode slurry followed drying are favorable in that excellent adhesion between each layer is obtained. Furthermore, in the examples, a method of producing the positive electrode active material layer by applying the positive electrode slurry on a separator followed by drying is employed instead of preparing the positive electrode active material layer on a substrate having a release property, only to prove the effects of the present invention. It is for easy understanding of the phenomenon by particularly focusing on an issue regarding the interface neighborhood between the resin current collector and positive electrode active material layer.

Hereinbelow, preferred embodiments of the constitution other than the resin current collector and electron conductive layer in the positive electrode (and negative electrode and bipolar type electrode) of a lithium ion secondary battery in which the positive electrode for a Li battery is used are explained. However, the present embodiment is characterized by the above resin current collector and electron conductive layer in the positive electrode for a Li battery, and other constitutions can be applied in the same manner as those conventionally known in a related art or with suitable modification thereof.

[Active Material Layer]

The active material layer of a Li battery of this embodiment contains an active material. Herein, the active material generates electric energy according to absorption and desorption of ions during charging and discharging. The active material includes a positive electrode active material which has a composition for absorbing ions during discharging and desorbing ions during charging and a negative electrode active material which has a composition for desorbing ions during discharging and absorbing ions during charging. The active material of this embodiment functions as the positive electrode active material layer if a positive electrode active material is used as an active material, while it functions as a negative electrode active material layer if a negative electrode active material is used. In the present specification, the descriptions that are common to the positive electrode active material and negative electrode active material are simply explained as an "active material."

(Positive Electrode Active Material)

Examples of the positive electrode active material include a lithium-transition metal complex oxide such as $LiMn_2O_4$, $LiCoO_2$, $LiNiO_2$, $Li(Ni-Mn-Co)O_2$, and a compound in which a part of these transition metals is replaced with another element, a lithium-transition metal phosphate compound, and a lithium-transition metal sulfate compound. In some cases, two or more kinds of the positive electrode active materials may be concurrently used. From the viewpoint of capacity and output characteristics, a lithium-transition metal complex oxide is preferably used as a positive electrode active material. A complex oxide containing lithium and nickel is more preferably used, and $Li(Ni-Mn-Co) O_2$ and a complex oxide in which a part of these transition metals is replaced with another element (hereinbelow, also simply referred to as "NMC complex oxide") are further preferably used. The NMC complex oxide has a layered crystal structure in which a lithium atom layer and a transition metal (Mn, Ni, and Co are arranged with regularity) atom layer are alternately stacked via an oxygen atom layer. One Li atom is included per atom of transition metal M and thus extractable Li amount is twice the amount of spinel lithium manganese oxide, that is, as the supply power is twice higher, it can have high capacity.

As described above, the NMC complex oxide includes a complex oxide in which a part of transition metal element is replaced with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC complex oxide preferably has a composition represented by the general formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, $b+c+d=1$. M is at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in the general formula (1). Incidentally, the composition of each element can be measured, for example, by inductively coupled plasma (ICP) atomic emission spectrometry.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of the cycle characteristics, it is preferable that a part of transition element be replaced by another metal element, and particularly, it is preferable that $0 < x \leq 0.3$ in the general formula (1). It is considered that the crystal structure is stabilized by dissolving at least one selected from the group consisting of Ti, Zr, Nb, W, P, Al, Mg, V, Ca, Sr, and Cr so that a decrease in capacity of a battery can be prevented even when charge and discharge are repeated, and thus excellent cycle characteristics can be realized.

As a more preferred embodiment, from the viewpoint of improving a balance between capacity and lifetime characteristics, it is preferable that b, c, and d in the general formula (1) be $0.44 \leq b \leq 0.51$, $0.27 \leq c \leq 0.31$, and $0.19 \leq d \leq 0.26$. For example, as compared with $LiCoO_2$, $LiMn_2O_4$, $LiNi_{1/3}Mn_{1/3}Co_{1/3}O_2$ and the like that exhibit actual performance in a general consumer use battery, $LiNi_{0.5}Mn_{0.3}Co_{0.2}O_2$ has a large capacity per unit mass, and can improve the energy density. Thus, $LiNi_{0.5}Mn_{0.3}Co_{0.2}O_2$ has an advantage that a compact and high capacity battery can be produced, and is also preferable, from the viewpoint of a cruising distance. Incidentally, in terms of having a larger capacity, $LiNi_{0.8}Co_{0.1}Al_{0.1}O_2$ is more advantageous. On the other hand, $LiNi_{0.5}Mn_{0.3}Co_{0.2}O_2$ has lifetime characteristics as excellent as $LiNi_{1/3}Mn_{1/3}Co_{1/3}O_2$.

(Negative Electrode Active Material)

Meanwhile, examples of a preferred negative electrode active material include a metal such as Si or Sn, an alloy containing Si, a metal oxide such as $TiO$, $Ti_2O_3$, $TiO_2$, $SiO_2$, $SiO$, or $SnO_2$, complex oxide between lithium and transition metal such as $Li_{4/3}Ti_{5/3}O_4$ or $Li_7MnN$, Li—Pb-based alloy, Li—Al-based alloy, Li, or carbon materials such as graphite (natural graphite and artificial graphite), carbon black, active carbon, carbon fiber, cokes, soft carbon, or hard carbon.

The active material layer of Li a battery of this embodiment contains, if necessary, other additives such as conductive aid, a binder, an electrolyte (polymer matrix, ion conductive polymer, electrolyte solution, or the like), or lithium salts for enhancing the ion conductivity. However, the content of the materials which can function as an active material is preferably 85 to 99.5% by mass in the active material layer.

The conductive aid indicates an additive which is blended in order to enhance the conductivity of the active material layer. Examples of the conductive aid include carbon materials such as carbon black including Ketjen black, acetylene black, and the like, graphite, and carbon fiber. When the active material layer contains a conductive aid, a conductive network in the inside of the active material layer is effectively formed, and it can contribute to improvement of the output characteristics of a battery. Herein, the content of the conductive aid is not particularly limited as long as the conductivity of an active material layer is increased to a desired level. However, it is preferably 0.5 to 15% by mass, and more preferably 1 to 10% by mass relative to the total amount (in terms of the solid content) of the active material layer.

The binder (binding agent) has a function of maintaining and preserving the structure of active material layer or conductive network by creating binding between the active material, conductive aid, or the like. The materials used as a binder are not particularly limited. However, in a case in which it is used for a negative electrode active material layer containing a negative electrode active material, it is preferable to contain an aqueous binder. The aqueous binder is advantageous in that, since it has a high binding property, water as a raw material is easily available and also only water vapor is generated during drying, the investment on facilities of a production line can be greatly reduced and an environmental load can be reduced. Furthermore, when it is used for a positive electrode active material layer containing a positive electrode active material, "binder materials other than the aqueous binder" that are described below can be used.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethyl acrylate, polyethyl methacrylate, polypropyl acrylate, polymethyl methacrylate (methyl methacrylate rubber), polypropyl methacrylate, polyisopropyl acrylate, polyisopropyl methacrylate, polybutyl acrylate, polybutyl methacrylate, polyhexyl acrylate, polyhexyl methacrylate, polyethylhexyl acrylate, polyethylhexyl methacrylate, polylauryl acrylate, polylauryl methacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably 80% by mol or more, and more preferably 90% by mol or more) and a modified product thereof (1 to 80% by mol saponified product in a vinyl acetate unit of a copolymer of ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), polyethylene glycol, a copolymer of (meth)acrylamide and/or (meth)acrylic acid salt [a (meth)acrylamide polymer, a (meth)acrylamide-(meth)acrylic acid salt copolymer, an alkyl (carbon atom number of 1 to 4) (meth)acrylate-(meth)acrylic acid salt copolymer, or the like], a styrene-maleic acid salt copolymer, a Mannich modified product of polyacrylamide, a formalin condensation type resin (a urea-formalin resin, a melamin-formalin resin, or the like), a polyamide polyamine or dialkylamine-epichlorohydrin copolymer, polyethyleneimine, casein, soybean protein, synthetic protein, and a water soluble polymer such as galactomannan derivatives. These aqueous binders may be used either singly or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. The mass content ratio of the styrene-butadiene rubber and the water soluble polymer is not particularly limited, but the styrene-butadiene rubber: the water soluble polymer is preferably 1:0.1 to 10, and more preferably 1:0.5 to 2.

Relative to the total amount of a binder in the negative electrode active material layer, the content of the aqueous binder in the negative electrode active material layer is preferably 80 to 100% by mass, preferably 90 to 100% by mass, and preferably 100% by mass.

Furthermore, the binder materials other than the aqueous binder (i.e., binder materials that are used for the positive electrode active material layer containing a positive electrode active material) are not particularly limited, but examples thereof include a thermoplastic polymer such as polyethylene, polypropylene, polyethylene terephthalate (PET), polyether nitrile (PEN), polyacrylonitrile, polyimide, polyamide, polyamideimide, cellulose, carboxymethyl cellulose (CMC), ethylene-vinyl acetate copolymer, polyvinyl chloride, styrene.butadiene rubber (SBR), isoprene rubber, butadiene rubber, ethylene.propylene rubber, ethylene.propylene.diene copolymer, styrene.butadiene.styrene block copolymer and a hydrogen-addition product thereof, and styrene.isoprene.styrene block copolymer and a hydrogen-addition product thereof, a fluororesin such as polyvinylidene fluoride (PVDF), polytetrafluoroethylene (PTFE), tetrafluoroethylene.hexafluoropropylene copolymer (FEP), tetrafluoroethylene.perfluoroalkylvinyl ether copolymer (PFA), ethylene.tetrafluoroethylene copolymer (ETFE), polychlorotrifluoroethylene (PCTFE), ethylene chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethylvinyl ether-tetrafluoroethylene-based fluorine rubber (VDF-PFMVE-TFE-based fluorine rubber), or vinylidene fluoride-chlorotrifluoroethylene-based fluorine rubber (VDF-CTFE-based fluorine rubber), and epoxy resin. Among them, polyvinylidene fluoride, polyimide, styrene-butadiene rubber, carboxymethyl cellulose, polypropylene, polytetrafluoroethylene, polyacrylonitrile, polyamide, and polyamideimide are more preferable. Those suitable binders have excellent heat resistance and very broad potential window, and are stable for both of the positive electrode potential and the negative electrode potential and usable for an active material layer. Those binders may be used either singly or in combination of two or more types thereof.

The content of the binder is not particularly limited as long as it is an amount allowing the binding of an active material. However, it is preferably 0.5 to 15% by mass, and more preferably 1 to 10% by mass relative to the total amount (in terms of the solid content) of the active material layer.

The thickness of active material layer of this embodiment is not particularly limited, and reference is suitably made to conventionally known knowledge regarding a battery. However, it is preferably 10 to 100 m, and more preferably 30 to 50 μm.

[Electrolyte Layer]

The electrolyte to be used in the electrolyte layer of a Li battery of this embodiment is not particularly limited. However, from the viewpoint of having the ion conductivity of the aforementioned active material layer for non-aqueous electrolyte secondary battery, a liquid electrolyte, a gel polymer electrolyte, or an ionic liquid electrolyte is used.

The liquid electrolyte has a function as a lithium ion carrier. The liquid electrolyte constituting the electrolyte solution layer has the form in which lithium salt as a supporting salt is dissolved in an organic solvent that is a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Further, as a lithium salt, the compound which may be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$, can be similarly employed. The liquid electrolyte may also contain additives other than the aforementioned components. Specific examples of those compounds include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1- vinylethylene carbonate, 1-ethyl-2-vinylethylene carbonate, vinylvinylene carbonate, allyl ethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methyleneethylene carbonate, and 1,1-dimethyl-2-methyleneethylene carbonate. Among them, vinylene carbonate, methylvinylene carbonate, and vinylethylene carbonate are preferable, and vinylene carbonate and vinylethylene carbonate are more preferable. These cyclic carbonate esters may be used either singly or in combination of two or more kinds thereof.

The gel polymer electrolyte has a constitution in which the aforementioned liquid electrolyte is injected to a matrix polymer (host polymer) consisting of an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVDF-HEP), poly(methyl methacrylate (PMMA), and copolymers thereof.

The matrix polymer of a gel polymer electrolyte can exhibit excellent mechanical strength by forming a cross-linked structure. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

The ionic liquid electrolyte is obtained by dissolving a lithium salt in an ionic liquid. Incidentally, the ionic liquid is a salt composed only of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), ($FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis (trifluoromethanesulfonyl) imide ion (($CF_3SO_2)_2N^-$), bis (pentafluoroethylsulfonyl) imide ion (($C_2F_5SO_2)_2N^-$), $BF_3C_2F_5^-$, tris(trifluoromethanesulfonyl) carbon acid ion (($CF_3SO_2)_3C^-$), perchlorate ion ($ClO_4^-$), dicyanamide ion (($CN)_2N^-$), organic sulfuric acid ion, organic sulfonic acid ion, $R^1COO^-$, $HOOCR^1COO^-$, $^-OOCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide, and N-methyl-N-propylpyrrolidinium bis (trifluoromethanesulfonyl) imide. These ionic liquids may be used either singly or in combination of two or more kinds thereof.

The lithium salt which is used in the ionic liquid electrolyte is the same lithium salt which is used in the liquid electrolyte described above. Incidentally, the concentration of the lithium salt is preferably 0.1 to 2.0 M, and more preferably 0.8 to 1.2 M.

An additive as described below may be added to the ionic liquid. When an additive is contained, charging and discharging characteristics and cycle characteristics may be further improved at a high rate. Specific examples of the additive include vinylene carbonate, ethylene carbonate, propylene carbonate, γ-butyrolactone, γ-valerolactone, methyl diglyme, sulfolane, trimethylphosphate, triethylphosphate, methoxymethyl ethyl carbonate, and fluorinated ethylene carbonate. These may be used either singly or in combination of two or more kinds thereof. The use amount when an additive is used is preferably 0.5 to 10% by mass, and more preferably 0.5 to 5% by mass with respect to the ionic liquid.

Furthermore, a separator may be used in an electrolyte layer. The separator has a function of holding an electrolyte so as to secure the lithium ion conductivity between a positive electrode and a negative electrode and a function of serving as a partition wall between a positive electrode and a negative electrode. In particular, in a case in which a liquid electrolyte or an ionic liquid electrolyte is used as an electrolyte, it is preferable to use a separator.

Examples of a separator form include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which a plurality of them are laminated (for example, a laminate with three-layer structure of PP/PE/PP), and a hydrocarbon based resin such as polyimide, aramid, or polyvinylydenefluoride-hexafluoropropylene (PVDF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 µm as a single layer or a multilayer. The fine pore diameter of the microporous (microporous membrane) separator is preferably 1 µm or less at most (in general, the pore diameter is about several tens of nanometers).

As a non-woven separator, conventionally known ones such as cotton, rayon, acetate, nylon, and polyester; polyolefin such as PP and PE; polyimide and aramid are used either singly or as a mixture. Further, the bulk density of the non-woven separator is not particularly limited as long as sufficient battery characteristics are obtained with an impregnated polymer gel electrolyte. Furthermore, it is sufficient that the thickness of the non-woven separator is the same as that of an electrolyte layer, and the thickness thereof is preferably 5 to 200 µm, and particularly preferably 10 to 100 µm.

[Method for Producing Electrode]

The method for producing a positive electrode (including the positive electrode of bipolar type electrode) is not particularly limited, and after forming first an electron conductive layer on a resin current collector (bipolar type resin current collector), the positive electrode active material layer is formed on top of the electron conductive layer. The method for producing a negative electrode (including the negative electrode of bipolar type electrode) is not particularly limited, and the negative electrode active material layer is formed on top of the resin current collector. The method for forming the positive electrode is as described above, and thus the explanations are omitted herein. Furthermore, the method for forming the negative electrode is not particularly limited, and a conventionally known method can be suitably used. One example of the method for forming an electrode active material layer is the method in which an electrode slurry is prepared by dispersing an active material, and if necessary, other components like a conductive aid and a binder, in a dispersion medium and the electrode slurry is applied on top of the resin current collector (or the electron conductive layer formed on the resin current collector) or on top of the separator followed by drying. Herein, the solvent which can be used as a dispersion medium is not particularly limited, and ketones such as acetone, aromatic hydrocarbon solvent such as toluene or xylene, a polar solvent such as N-methyl-2-pyrrolidone (NMP), dimethyl formamide (DMF), dimethyl acetamide (DMAc), dimethyl sulfoxide (DMSO), tetrahydrofuran (THF), acetonitrile, or the like can be used. They may be used either singly or in combination of two or more types thereof. Concentration of the active material in electrode slurry is not particularly limited, and it can be suitably selected depending on the thickness of an active material layer or the like. The application method is not particularly limited, either, and examples thereof include brush coating, bar coating, spray coating, screen printing, and inkjet method. The application amount of the active material is not particularly limited. The drying temperature and drying time are not particularly limited. Furthermore, the drying can be carried out under atmospheric pressure or reduced pressure.

The positive electrode (and negative electrode, and bipolar type electrode) of the present invention which is produced as described above is suitably used for a lithium ion secondary battery. Incidentally, the lithium ion secondary battery is not limited to a flat shape of laminate type, and it may be a wound type lithium ion secondary battery. The wound type lithium ion secondary battery can have a cylindrical shape or a flat and rectangular shape obtained by modifying the cylindrical shape, and there is no particular limitation. As an outer casing material of the cylindrical shape, a laminate film may be used, or a cylindrical can (metal can) of a related art may be used, and thus there is no particular limitation. Preferably, the power generating element is encased with an aluminum laminate film. The weight reduction may be achieved with such form.

As for the major constitutional member of the lithium ion secondary battery other than the positive electrode (i.e., negative electrode, electrolyte layer, current collecting plate, lead, and outer casing material), reference is suitably made to conventionally known knowledge. Furthermore, the lithium ion secondary battery can be produced based on a method well known in the art.

The lithium ion secondary battery having the above positive electrode can be suitably used as a power source or an auxiliary power source for operating a vehicle like electric car, hybrid electric car, fuel cell car, and hybrid fuel cell electric car which require high mass energy density, high mass output density, or the like.

Furthermore, the application is not limited to the lithium ion secondary battery, and the positive electrode can be applied to a secondary battery of other type or even to a primary battery.

EXAMPLES

Hereinbelow, by using the examples and comparative examples, the positive electrode for a lithium battery and a lithium battery using it are explained in greater detail. However, the technical scope of the present invention is not limited to the following examples and comparative examples. Furthermore, unless specifically described otherwise, the operations are performed at room temperature (25° C.).

Comparative Example 1

A positive electrode slurry in which a positive electrode active material, a binder, and a conductive aid are dispersed (mass ratio of positive electrode active material:binder:conductive aid=85:5:10) in N-methyl-2-pyrrolidone (NMP) was prepared. The positive electrode slurry was applied on a polypropylene microporous separator (thickness of 25 µm) followed by drying. Then, by punching to have a diameter of 15 mm, a laminate structure of positive electrode active material layer+separator having thickness of 40 µm ($LiCoO_2$ net weight of 9.3 mg/cm$^2$ per unit area) was obtained. Furthermore, for each of the above positive electrode active material, binder, and conductive aid, $LiCoO_2$ having average particle diameter of 8 µm, PVDF, and acetylene black (average particle diameter of 35 nm, Denka Black HS-100) were used.

The above laminate structure was disposed such that the positive electrode side is in contact with the top of the resin current collector (film) having polypropylene (resin matrix) thickness of 100 µm which contains 20% by mass of acetylene black (average particle diameter of 35 nm, Denka Black HS-100) (conductive filler A). Furthermore, on the opposite side of the laminate structure, a counter electrode of lithium metal was disposed to give a cell (power generating element). Herein, for the resin current collector (film) and lithium metal (counter electrode), those punched to have a diameter of 15 mm were used. Furthermore, the volume resistance of the resin current collector (film) was 20 Ω·cm.

The above cell (power generating element) was added to a coin cell container, and an electrolyte solution of 1 M $LiPF_6$ (EC:DEC=1:1, mass ratio) was added thereto. Then, the cell (power generating element) was impregnated in the electrolyte solution, and by covering the container with a lid, a coin cell was produced. The charging and discharging evaluation was carried out by using this coin cell.

Reference Example 1

The positive electrode slurry which has been prepared in the same manner as Comparative Example 1 was applied on aluminum foil with thickness of 20 µm (Al current collector) followed by drying. Then, by punching to have a diameter of 15 mm, a positive electrode active material layer with thickness of 35 µm was formed to give a positive electrode.

On the positive electrode active material layer side of the positive electrode, the same polypropylene microporous separator (thickness of 25 µm) as Comparative Example 1 was disposed such that they are in contact with each other.

Furthermore, on the opposite side of the separator, a counter electrode of lithium metal was disposed to give a cell (power generating element). Herein, for the lithium metal (counter electrode), those punched to have a diameter of 15 mm were used.

The above cell (power generating element) was added to a coin cell container, and an electrolyte solution of 1 M LiPF$_6$ (EC:DEC=1:1, mass ratio) was added thereto. Then, the cell (power generating element) was impregnated in the electrolyte solution, and by covering the container with a lid, a coin cell was produced. The charging and discharging evaluation was carried out by using this coin cell.

Example 1

A laminate structure of positive electrode active material layer+separator was produced in the same manner as Comparative Example 1.

Next, by mixing 8 parts by mass of 12% by mass NMP solution of polyvinylidene fluoride (Kureha KF1120), 88 parts by mass of NMP, and 4 parts by mass of acetylene black (the conductive filler B; average particle diameter of 35 nm; Denka Black HS-100), a slurry for forming an electron conductive layer was prepared. Then, this slurry was applied on a surface of the same resin current collector as Comparative Example 1 using an applicator while having a gap of 150 μm, and by vacuum drying for 8 hours at 80° C., the solvent was removed and the electron conductive layer was formed. By punching to have a diameter of 15 mm, a laminate structure of resin current collector+electron conductive layer was obtained. At that time, the film thickness of the electron conductive layer was 13 μm. The polyvinylidene fluoride used for forming the electron conductive layer was a polymer having vinylidene fluoride as a repeating unit, which is one kind of polymer having a repeating unit containing an electron withdrawing group. Furthermore, the volume resistance of the resin current collector (film) was 20 Ω·cm like Comparative Example 1. Furthermore, the volume resistance of the electron conductive layer was 2 Ω·cm.

On the laminate structure of resin current collector+ electron conductive layer, the laminate structure of positive electrode active material layer+separator was added (laminated) such that the electron conductive layer and the positive electrode active material layer are in contact with each other. Furthermore, on the opposite side (separator side) of the laminate structure of positive electrode active material layer+separator, a counter electrode of lithium metal was disposed to give a cell (power generating element). Herein, for lithium metal (counter electrode), those punched to have a diameter of 15 mm were used.

The above cell (power generating element) was added to a coin cell container, and an electrolyte solution of 1 M LiPF$_6$ (EC:DEC=1:1, mass ratio) was added thereto. Then, the cell (power generating element) was impregnated in the electrolyte solution, and by covering the container with a lid, a coin cell was produced. The charging and discharging evaluation was carried out by using this coin cell. Furthermore, the oxidation resistance of the electron conductive layer at room temperature (25° C.) was confirmed to be as high as 4.3 V or more based on Li.

Example 2

A laminate structure of positive electrode active material layer+separator was prepared in the same manner as Comparative Example 1.

Next, by mixing 10 parts by mass of an epoxy resin in liquid phase, 14 parts by mass of a crystalline bifunctional epoxy resin, 73 parts by mass of methyl ethyl ketone, 3 parts by mass of acetylene black that is the same as the acetylene black of Example 1, and 0.2 part by mass of a curing agent, a slurry for forming an electron conductive layer was prepared. Then, this slurry was applied on a surface of the same resin current collector as Comparative Example 1 using an applicator while having a gap of 30 μm, and by vacuum drying for 3 hours at 90° C., the solvent was removed and the electron conductive layer was formed. By punching to have a diameter of 15 mm, a laminate structure of resin current collector+electron conductive layer was obtained. At that time, the film thickness of the electron conductive layer was 5 μm. Furthermore, the resin used for forming the electron conductive layer was an epoxy resin, which is one kind of polymer having a repeating unit containing an electron withdrawing group. Specifically, for the epoxy resin in liquid phase among epoxy resins, CELLOXIDE 2021P (alicyclic epoxy resin; manufactured by Daicel Corporation) was used. Furthermore, for the crystalline bifunctional epoxy resin among epoxy resins, MARPROOF G2050M (copolymer of styrene and glycidyl methacrylate; manufactured by NOF Corporation) was used. For the curing agent of the above epoxy resin (polymerization initiator or cross-linking agent), SANAID SI-60 (manufactured by Sanshin Chemical Industry Co., Ltd.) was used. Furthermore, the volume resistivity of the resin current collector (film) was 20 Ω·cm like Comparative Example 1. Furthermore, the volume resistance of the electron conductive layer was 13 Ω·cm.

On the laminate structure of resin current collector+ electron conductive layer, the laminate structure of positive electrode active material layer+separator was added (laminated) such that the electron conductive layer and the positive electrode active material layer are in contact with each other. Furthermore, on the opposite side (separator side) of the laminate structure of positive electrode active material layer+separator, a counter electrode of lithium metal was disposed to give a cell (power generating element). Herein, for lithium metal (counter electrode), those punched to have a diameter of 15 mm were used.

The above cell (power generating element) was added to a coin cell container, and an electrolyte solution of 1 M LiPF$_6$ (EC:DEC=1:1, mass ratio) was added thereto. Then, the cell (power generating element) was impregnated in the electrolyte solution, and by covering the container with a lid, a coin cell was produced. The charging and discharging evaluation was carried out by using this coin cell. Furthermore, the oxidation resistance of the electron conductive layer at room temperature (25° C.) was confirmed to be as high as 4.3 V or more based on Li.

(Charging and Discharging Evaluation Test)

Each coin cell prepared in Comparative Example 1, Reference Example 1, and Examples 1 and 2 was set in an incubator at 45° C. Then, the cycle durability test was carried out at the following charging and discharging conditions.

(Charging and Discharging Conditions)

Charging was performed at CC-CV of 0.2 C to 4.3 V for 10 hours and discharging at CC of 0.2 C to 3.0 V. This process is taken as 1 cycle, and by repeating 50 cycles, the cycle durability test was carried out.

(Evaluations Results)

The change in capacity retention rate relative to the initial discharge capacity is expressed against the charging and discharging cycle as it is shown in FIG. 7. As it is clearly shown in FIG. 7, the resin current collector (film) having thickness of 100 μm which is formed of polypropylene (resin matrix) containing 20% by mass of acetylene black (the conductive filler A) of Comparative Example 1 showed a rapid cycle deterioration. On the other hand, it was confirmed that, when the electron conductive layer of the Examples is disposed between the same resin current collector (film) as that of Comparative Example 1 and the positive electrode active material layer, the cycle durability is significantly improved.

It was also confirmed that, when the electron conductive layer of the Examples is disposed between the resin current collector and the positive electrode active material layer, the weight is greatly reduced (i.e., having higher energy) compared to the Al current collector of Reference Example 1 and the same excellent cycle durability as the Al current collector can be exhibited.

The present application is based on Japanese Patent Application No. 2015-067223 filed on Mar. 27, 2015, and its enclosure is entirely incorporated herein by reference.

REFERENCE SIGNS LIST

10a Flat type (laminate type) and non-bipolar type non-aqueous electrolyte lithium ion secondary battery
10b Flat type (laminate type) and bipolar type non-aqueous electrolyte lithium ion secondary battery
11 Positive electrode current collector
11' Bipolar type current collector
11a Outermost layer bipolar type current collector on positive electrode side
11b Outermost layer bipolar type current collector on negative electrode side
12 Negative electrode current collector
13 Positive electrode active material layer
14 Electron conductive layer
15 Negative electrode active material layer
17 Electrolyte layer
19 Single battery layer
21, 57 Power generating element
25 Positive electrode current collecting plate
27 Negative electrode current collecting plate
29, 52 Battery outer casing material
31 Seal part
40 Positive electrode for Li battery
41 Positive electrode current collector (including bipolar type current collector)
42 Electron conductive layer
43 Positive electrode active material layer
50 Lithium ion secondary battery
58 Positive electrode tab
59 Negative electrode tab

The invention claimed is:

1. A bipolar type electrode for a lithium battery comprising a resin current collector containing a polyolefin-based resin matrix and a first conductive filler, an electron conductive layer provided to have a direct contact with a first surface of the resin current collector, a positive electrode active material layer, and a negative electrode active material layer provided to have a direct contact with a second surface of the resin current collector,
wherein the polyolefin-based resin matrix is polyethylene (PE), polypropylene (PP), polymethylpentene (PMP), or a copolymer or a mixture thereof,
wherein the electron conductive layer is selected from a first electron conductive layer comprising an epoxy resin and a second conductive filler,
a second electron conductive layer consisting of a polymer having a repeating unit derived from vinylidene fluoride and a third conductive filler, or
a third electron conductive layer comprising a polymer having a repeating unit derived from carbonic acid ester and a fourth conductive filler.

2. The bipolar type electrode for a lithium battery according to claim 1, wherein the second conductive filler of the first electron conductive layer, the third conductive filler of the second electron conductive layer, or the fourth conductive filler of the third electron conductive layer is a carbon-based filler.

3. The bipolar type electrode for a lithium battery according to claim 1, wherein an oxidation resistance of the electron conductive layer at room temperature (25° C.) is 4.2 V or higher based on Li.

4. A lithium battery comprising the bipolar type electrode for a lithium battery according to claim 1.

5. A bipolar type electrode for a lithium battery comprising a resin current collector containing a polyolefin-based resin matrix and a conductive filler, an electron conductive layer provided to have a direct contact with a first surface of the resin current collector, a positive electrode active material layer, and a negative electrode active material layer provided to have a direct contact with a second surface of the resin current collector,
wherein the polyolefin-based resin matrix is polyethylene (PE), polypropylene (PP), polymethylpentene (PMP), or a copolymer or a mixture thereof,
wherein the electron conductive layer contains a p type conductive polymer.

6. The bipolar type electrode for a lithium battery according to claim 5, wherein an oxidation resistance of the electron conductive layer at room temperature (25° C.) is 4.2 V or higher based on Li.

7. A lithium battery comprising the bipolar type electrode for a lithium battery according to claim 5.

8. A positive electrode for a lithium battery comprising a resin current collector containing a polyolefin-based resin matrix and a first conductive filler, and a positive electrode active material layer,
wherein the polyolefin-based resin matrix is polyethylene (PE), polypropylene (PP), polymethylpentene (PMP), or a copolymer or a mixture thereof,
wherein an electron conductive layer is disposed to have a direct contact with a surface of the resin current collector, and
wherein the electron conductive layer mainly contains at least one of an epoxy resin, a polymer having a repeating unit derived from vinylidene fluoride, or a polymer having a repeating unit derived from carbonic acid ester, and a second conductive filler.

9. The positive electrode for a lithium battery according to claim 8, wherein the conductive filler used for the electron conductive layer is a carbon-based filler.

10. The positive electrode for a lithium battery according to claim 8, wherein an oxidation resistance of the electron conductive layer at room temperature (25° C.) is 4.2 V or higher based on Li.

11. A lithium battery comprising the positive electrode for a lithium battery according to claim 8.

12. A positive electrode for a lithium battery comprising a resin current collector containing a polyolefin-based resin matrix and a conductive filler, and a positive electrode active material layer, wherein the polyolefin-based resin matrix is polyethylene (PE), polypropylene (PP), polymethylpentene (PMP), or a copolymer or a mixture thereof, wherein an electron conductive layer is disposed to have a direct contact with a surface of the resin current collector, and wherein the electron conductive layer contains a p type conductive polymer.

13. The positive electrode for a lithium battery according to claim 12, wherein an oxidation resistance of the electron conductive layer at room temperature (25° C.) is 4.2 V or higher based on Li.

14. A lithium battery comprising the positive electrode for a lithium battery according to claim 12.

15. The bipolar type electrode for a lithium battery according to claim 1, wherein the electron conductive layer is the first electron conductive layer comprising the epoxy resin and the second conductive filler.

16. The bipolar type electrode for a lithium battery according to claim 1, wherein the electron conductive layer is the second electron conductive layer consisting of the polymer having the repeating unit derived from vinylidene fluoride and the third conductive filler.

17. The bipolar type electrode for a lithium battery according to claim 1, wherein the electron conductive layer is the third electron conductive layer comprising the polymer having the repeating unit derived from carbonic acid ester and the fourth conductive filler.

18. The bipolar type electrode for a lithium battery according to claim 1, wherein the first conductive filler is a carbon-based filler.

19. The bipolar type electrode for a lithium battery according to claim 2, wherein the first conductive filler is a carbon-based filler.

* * * * *